US007633504B2

(12) United States Patent
Asente et al.

(10) Patent No.: US 7,633,504 B2
(45) Date of Patent: *Dec. 15, 2009

(54) ASSIGNING SUBPATH ATTRIBUTES IN A DRAWING

(75) Inventors: Paul J. Asente, La Honda, CA (US); Michael D. Schuster, Woodside, CA (US)

(73) Assignee: Adobe Systems Incorporated, San Jose, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 11/825,049

(22) Filed: Jul. 3, 2007

(65) Prior Publication Data

US 2007/0252844 A1 Nov. 1, 2007

Related U.S. Application Data

(62) Division of application No. 11/109,837, filed on Apr. 19, 2005, now Pat. No. 7,256,785.

(51) Int. Cl.
*G06T 11/20* (2006.01)
*G09G 5/00* (2006.01)
*G09G 5/02* (2006.01)

(52) U.S. Cl. .................. 345/442; 345/441; 345/443; 345/581; 345/582; 345/586; 345/589; 345/593; 345/629; 345/642; 345/643

(58) Field of Classification Search ................ 345/441, 345/442, 443, 581, 582, 586, 589, 593, 629, 345/642, 643
See application file for complete search history.

(56) References Cited

U.S. PATENT DOCUMENTS 4,916,624 A    4/1990  Collins et al.
5,125,074 A    6/1992  Labeaute et al.
5,137,662 A    8/1992  Hull et al.
5,278,983 A *  1/1994  Kawabe et al. ............. 345/420

(Continued)

FOREIGN PATENT DOCUMENTS

JP          62249281 A      4/1986

(Continued)

OTHER PUBLICATIONS

Macromedia, Macromedia-Flash MX 2004, Accessibility Macromedia, 1995-2004, http://web.archive.org/web/20041103072103/http://www.macromedia.com/software/flash.

(Continued)

*Primary Examiner*—Ulka Chauhan
*Assistant Examiner*—Jeffrey J Chow
(74) *Attorney, Agent, or Firm*—Van Pelt, Yi & James LLP

(57) ABSTRACT

Techniques for assigning a subpath attribute to a subpath in a drawing are disclosed. One technique includes editing the drawing to define a current path having a current subpath, matching a previous vertex in a previous path with a current vertex in the current path, and assigning a current subpath attribute to the current subpath based on the vertex match. Another technique includes editing the drawing to define a current path having a current subpath, comparing the current subpath with a previous subpath having a previous subpath attribute, and assigning a previous subpath attribute to the current subpath based on the comparison.

11 Claims, 27 Drawing Sheets

U.S. PATENT DOCUMENTS

| | | | |
|---|---|---|---|
| 5,295,235 A | | 3/1994 | Newman |
| 5,553,168 A | | 9/1996 | Hennessey et al. |
| 5,579,461 A | | 11/1996 | Saha |
| 5,831,633 A | * | 11/1998 | Van Roy ..................... 345/441 |
| 5,934,209 A | | 8/1999 | Mizuno |
| 6,049,339 A | * | 4/2000 | Schiller et al. .............. 345/630 |
| 6,069,633 A | | 5/2000 | Apparao et al. |
| 6,504,541 B1 | | 1/2003 | Liu et al. |
| 6,515,675 B1 | | 2/2003 | Bourdev |
| 6,522,328 B1 | * | 2/2003 | Asente ..................... 345/441 |
| 6,556,212 B1 | | 4/2003 | Griffin |
| 6,720,977 B1 | * | 4/2004 | Bourdev et al. ............. 345/629 |
| 6,727,906 B2 | * | 4/2004 | Lockeridge et al. ......... 345/581 |
| 6,734,987 B1 | | 5/2004 | Cauligi |
| 6,768,488 B1 | * | 7/2004 | Kotani et al. ................ 345/441 |
| 6,894,704 B1 | | 5/2005 | Bourdev et al. |
| 6,982,723 B1 | * | 1/2006 | Szymaniak ................ 345/611 |
| 7,084,882 B1 | | 8/2006 | Dorum et al. |
| 2002/0030677 A1 | * | 3/2002 | Huang et al. ................ 345/420 |
| 2002/0145616 A1 | * | 10/2002 | Doan ........................ 345/629 |
| 2003/0122830 A1 | | 7/2003 | Yap |
| 2004/0119724 A1 | * | 6/2004 | Hawksworth ............... 345/626 |
| 2004/0183800 A1 | | 9/2004 | Peterson |
| 2005/0007381 A1 | | 1/2005 | Chen |
| 2005/0156930 A1 | * | 7/2005 | Nishioka et al. ............ 345/442 |
| 2005/0246145 A1 | | 11/2005 | Zhu |
| 2005/0253844 A1 | | 11/2005 | Hoppe et al. |
| 2006/0077210 A1 | | 4/2006 | Morris et al. |
| 2006/0082597 A1 | | 4/2006 | McDaniel et al. |
| 2007/0206007 A1 | | 9/2007 | Taubin |

FOREIGN PATENT DOCUMENTS

JP        02257368 A       3/1989

OTHER PUBLICATIONS

Adobe, Adobe Illustrator CS, The Industry-Standard vector graphics software, 2004, http://web.archive.org/web/20041130094541/www.adobe.com/products/illustrator/main.html.

Macromedia, The History of Flash, 1995-2005, http://www.macromedia.com/macromedia/events/john_gay/.

Guha et al., Rock: A Robust Clustering Algorithm for Categorical Attributes, IEEE Conference on Data Engineering, 1999.

Gangnet et al., SIGGRAPH'94 Technical Sketch Submission, Automatic Gap Closing for Freehand Drawing, http://www.lri.fr/~fekete/ps/siggraph94.pdf.

Flashmagizine.com, The Flash History, How it all began, Jul. 31, 2002.

Baudelaire et al., Planar Maps: An Interaction Paradigm for Graphic Design, CHI'89 Proceedings.

Gangnet et al., Incremental Computation of Planar Maps, Computer Graphics, vol. 23, No. 3, Jul. 1989.

Jonathan Richard Shewchuk, Robust Adaptive Floating-Point Geometric Predicates, May 1996.

Victor J. Milenkovic, Shortest Path Geometric Rounding, , Jul. 27, 2000.

John D. Hobby, Practical Segment Intersection with Finite Precision Output, Computational Geometry, Apr. 15, 1996.

Bentley et al., "Algorithms for Reporting and Counting Geometric Intersections", IEEE Transactions on Computer, vol. C-28, No. 9, Sep. 1979, pp. 693-647.

Adobe, "Adobe Illustrator 10 User Guide", 2001, pp. 254 and 255.

* cited by examiner

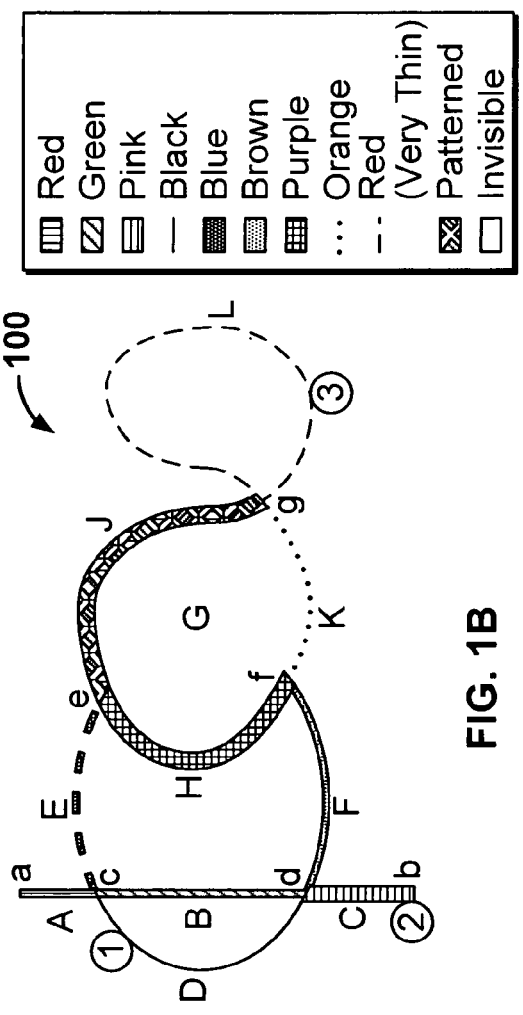
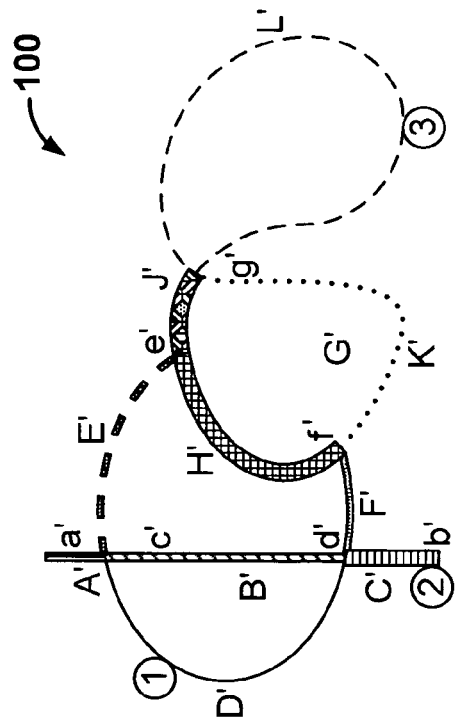
FIG. 1B
FIG. 1D
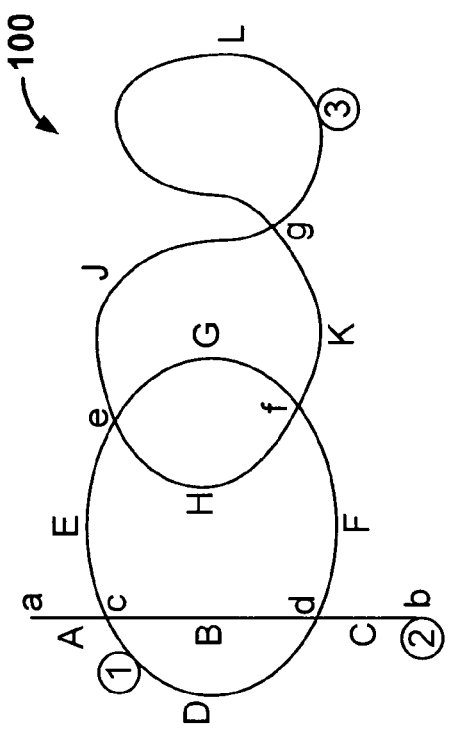
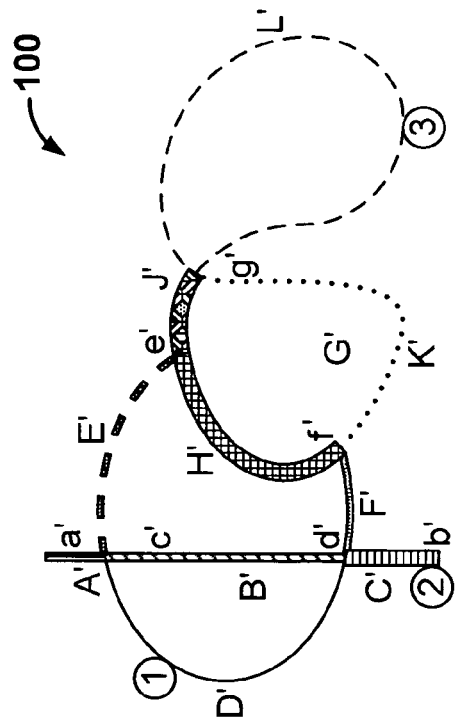
FIG. 1A
FIG. 1C

ASSIGNING SUBPATH ATTRIBUTES IN A DRAWING

CROSS REFERENCE TO OTHER APPLICATIONS

This application is a divisional of U.S. patent application Ser. No. 11/109,837, entitled ASSIGNING SUBPATH ATTRIBUTES IN A DRAWING filed Apr. 19, 2005 now U.S. Pat. No. 7,256,785 which is incorporated herein by reference for all purposes.

BACKGROUND OF THE INVENTION

Drawings are used to express ideas visually on the web, in print or in other media. Drawings can be created and edited in software using various drawing applications. A typical drawing includes a plurality of paths, each of which has a region attribute, such as color. Paths in a drawing are typically assigned a single color along the entire length of each path. When a path is edited, the entire path retains the same color as before the edit. Coloring subpaths of the path is typically not possible in a straightforward way. To color subpaths of the path, the path needs to be separated into independent paths and colored individually. However, the subpaths are no longer part of the same path. The original path is lost and can no longer be manipulated as a single path. It would be useful to have a way to assign attributes to subpaths in a drawing and maintain consistency of subpath attributes across edits.

BRIEF DESCRIPTION OF THE DRAWINGS

Various embodiments of the invention are disclosed in the following detailed description and the accompanying drawings.

FIG. 1A illustrates an example of a drawing.

FIG. 1B illustrates an example of a drawing with colored subpaths.

FIG. 1C illustrates a modified version of drawing 100.

FIG. 1D illustrates a modified version of drawing 100 having colored subpaths.

DETAILED DESCRIPTION

Figure 2:
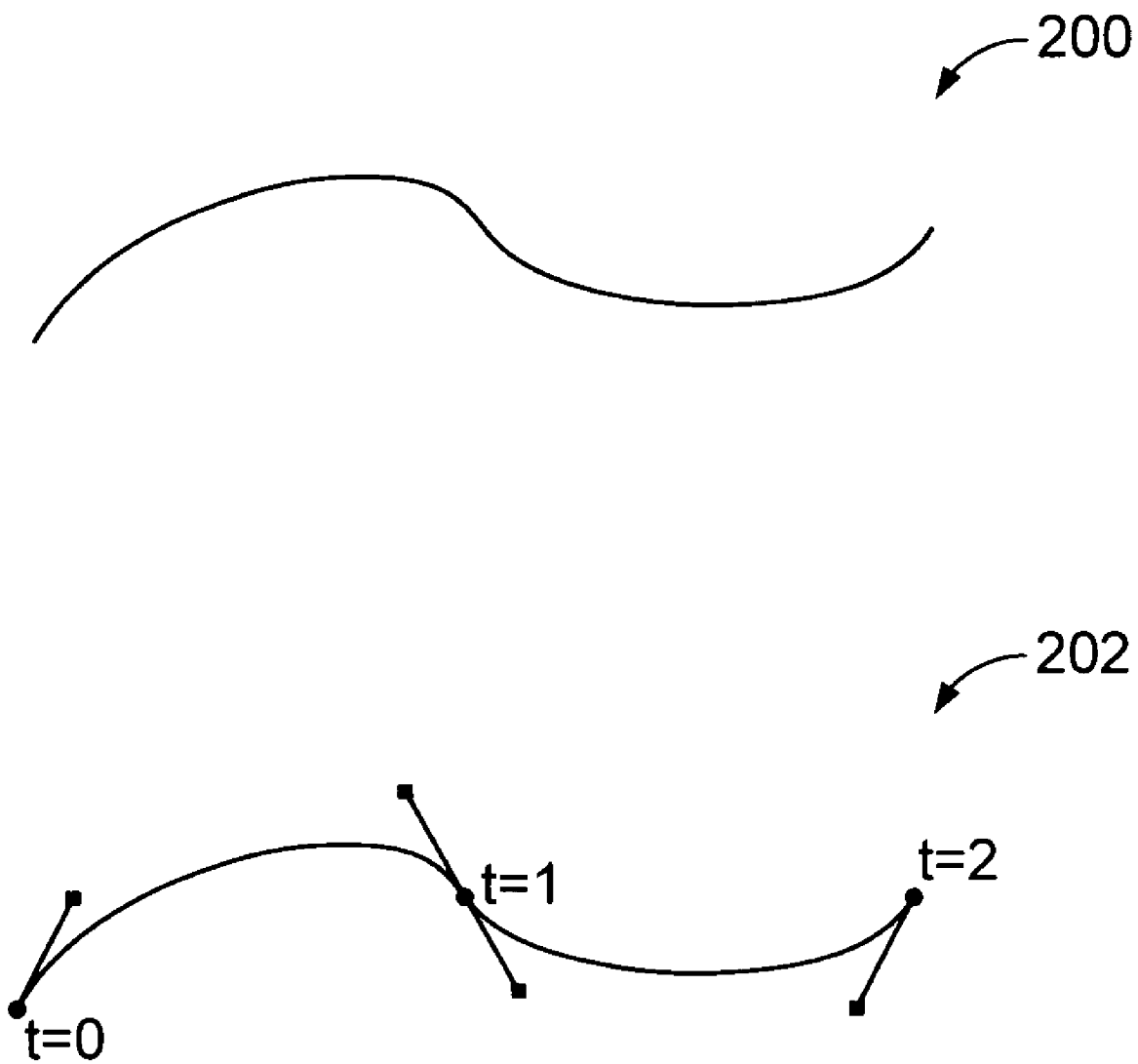
FIG. 2 illustrates a path and a parametric representation of the path.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A set of paths on a plane can intersect themselves or each other to define a set of subpaths. When an edit is made to the drawing, some of the subpaths may be modified. Attributes can be assigned to the subpaths based on an analysis of the current paths and previous attributes and paths.

FIG. 1A illustrates an example of a drawing. A set of open or closed paths on a plane can intersect themselves or each other to define a set of subpaths. A path refers to a curve, line, or other similar object. A subpath, as used herein, refers to an edge or a portion of a path that is between two intersections or path endpoints. An open path that does not intersect itself or other paths has a single subpath going from one endpoint to the other. A closed path that does not intersect itself or other paths also has a single subpath going along the entire path, with no specific start or end point.

Subpaths can be given different attributes. Modifying the paths in the set creates current subpaths. Attributes can be assigned to these current subpaths to be consistent with the attributes of the previous subpaths, as more fully described below.

In this example, drawing 100 is shown to include three paths: the ellipse 1, the line segment 2, and the self-intersecting path 3. There are two end points, a and b, and five intersections, c through g. Paths 1 and 3 are examples of closed paths. Path 2 is an example of an open path. In the following figures, paths are identified with circled numbers. Intersections are identified with lower-case letters, and subpaths are identified with upper-case letters.

Drawing 100 is shown to include 11 subpaths:
A path 2 from a to c
B path 2 from c to d
C path 2 from d to b
D path 1 from c to d
E path 1 from c to e
F path 1 from d to f
G path 1 from e to f
H path 2 from e to f
J path 2 from e to g
K path 2 from f to g
L path 2 from g to g Different attributes can be assigned to different subpaths. As used herein, attribute or color refer to any attribute of a region, path, subpath, or shape. In any of these examples, other attributes can be used, including, but not limited to, color, absence of color, a pattern (e.g., hatching), a texture, a gradient, a portion of an image, or an abstract attribute, such as an identifier.

For example, FIG. 1B illustrates an example of a drawing with colored subpaths. In this example,
A is medium-thick red
B is medium-thick green
C is thick pink
D is thin black
E is medium-thick dashed blue
F is medium-thick brown
G is invisible
H is very thick purple
J is very thick patterned
K is dotted orange
L is very thin red.

FIG. 1C illustrates a modified version of drawing 100. Path 2 has been moved to the right, and path 3 has been moved down and reshaped. The changed paths have a current set of intersections and end points (a' through g') and a current set of subpaths (A' through L').

If the subpaths in FIG. 1A had attributes as in FIG. 1B, and FIG. 1A were transformed to be FIG. 1C, it is possible to assign attributes to the current subpaths A' through L'.

For example, FIG. 1D illustrates a modified version of drawing 100 having colored subpaths. Attributes can be assigned to the modified subpaths based on an analysis of the original attributes and subpaths.

As used herein, the drawing prior to the modification comprises a set of parameterized paths with identifiers (called the "previous set"; paths in it are called "previous paths" and subpaths defined by these paths are called "previous subpaths"). After the modification, the drawing comprises a current set (called the "current set" of "current paths", defining "current subpaths"). For example, the current set could include the previous paths, with some paths deleted, some paths added, and some paths modified. The colors of current subpaths can be assigned based on the colors of previous subpaths, as more fully described below.

FIG. 2 illustrates a path and a parametric representation of the path. Path 200 can be converted to (or arbitrarily closely approximated by) a parametric representation 202. For example, the path can be parametrized in one variable, t, where t varies from 0 to some positive value. In some embodiments, the parametric representation is an end-to-end connected set of Bèzier cubic curves, with each segment parameterized from 0 to 1. Points along the path are given an overall parameterization value of the sum of their Bèzier parameter and their curve number in the ordering, starting with 0 for the first curve. The first Bèzier curve is parameterized from 0-1, the second from 1-2, the third from 2-3, etc. In this example, parametric representation 202 is a connected Bèzier parametric representation. In some embodiments, closed paths are given an arbitrary but consistent 0 point in the parameterization. In other words, if the path does not change, the 0 point does not change, and if the 0 point changes, the path is considered modified.

In some embodiments, each path is associated with a direction. For example, the direction could be defined by its parameterization. The path can be said begin at the point with a 0 parameter and end at the point with the highest parameter. If one traverses a path from beginning to end, certain things may be said to be on the left side of the path or on the right side of the path.

In some embodiments, each path in a set is given an arbitrary but unique identifier that persists across modifications. Paths added to the set are given an identifier different from any already in the set. A vertex, as used herein, refers to an end point or intersection along a path.

Figure 3:
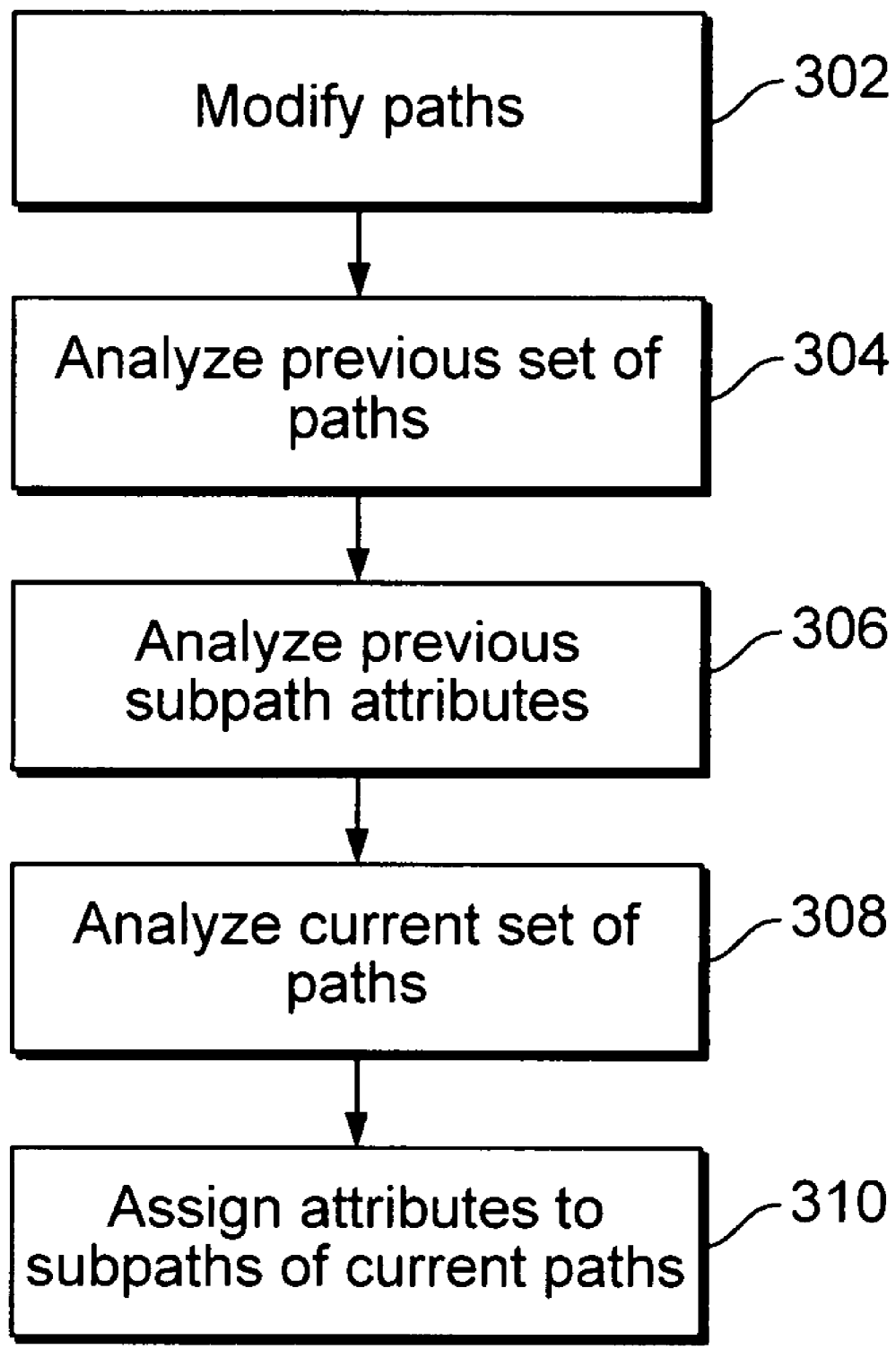
FIG. 3 is a flowchart illustrating a process for assigning attributes to current subpaths.

FIG. 3 is a flowchart illustrating a process for assigning attributes to current subpaths. In this example, a set of paths defines a set of subpaths, with each subpath having a set of attributes. A modification is made to the set of paths (302). The modification can include adding one or more paths to the set, removing one or more paths from the set, or changing the shapes, positions, or orientations of one or more paths in the set. The previous set of paths is analyzed (304). The previous subpath attributes are analyzed (306). The current set of paths is analyzed (308). Attributes are assigned to the current subpaths (310). (304)-(310) are more fully described below.

Figure 4:
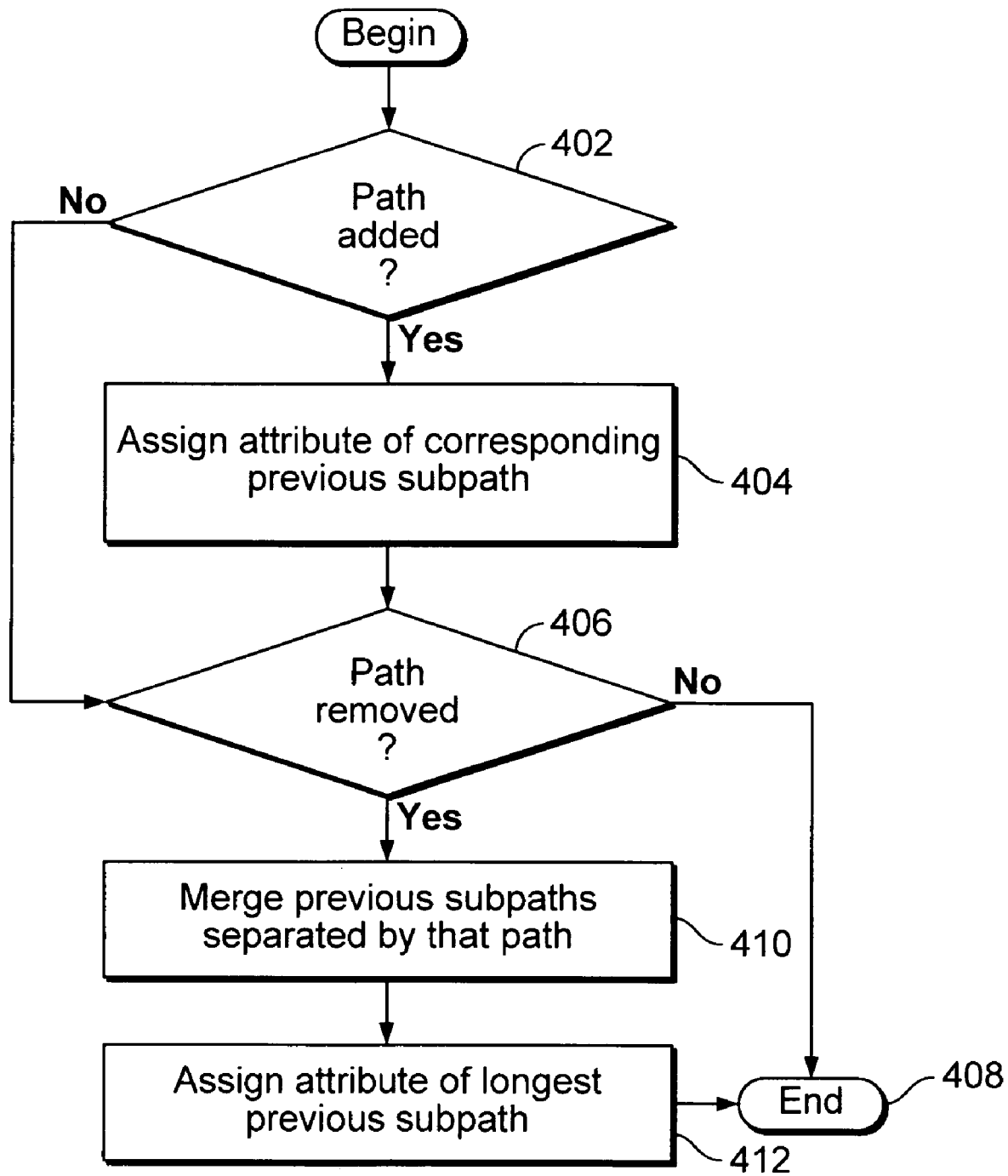
FIG. 4 is a flowchart illustrating a process of analyzing and assigning attributes to current subpaths when a path is added or removed.

FIG. 4 is a flowchart illustrating a process of analyzing and assigning attributes to current subpaths when a path is added or removed. In some embodiments, this process can be used to perform (304)-(310). In this example, a path is added or removed. A path in the current set that has an identifier not assigned to any path in the previous set has been added to the current set. A path in the previous set that has an identifier not assigned to any path in the current set has been removed from the previous set.

If a path has been added (402), subpaths along that path are not assigned any attributes unless they are also subpaths along a different current path. If the path intersects a previous path, it divides a previous subpath into two or more current subpaths. Each of these subpaths is assigned the attributes of the corresponding previous subpath (404).

Figure 5A:
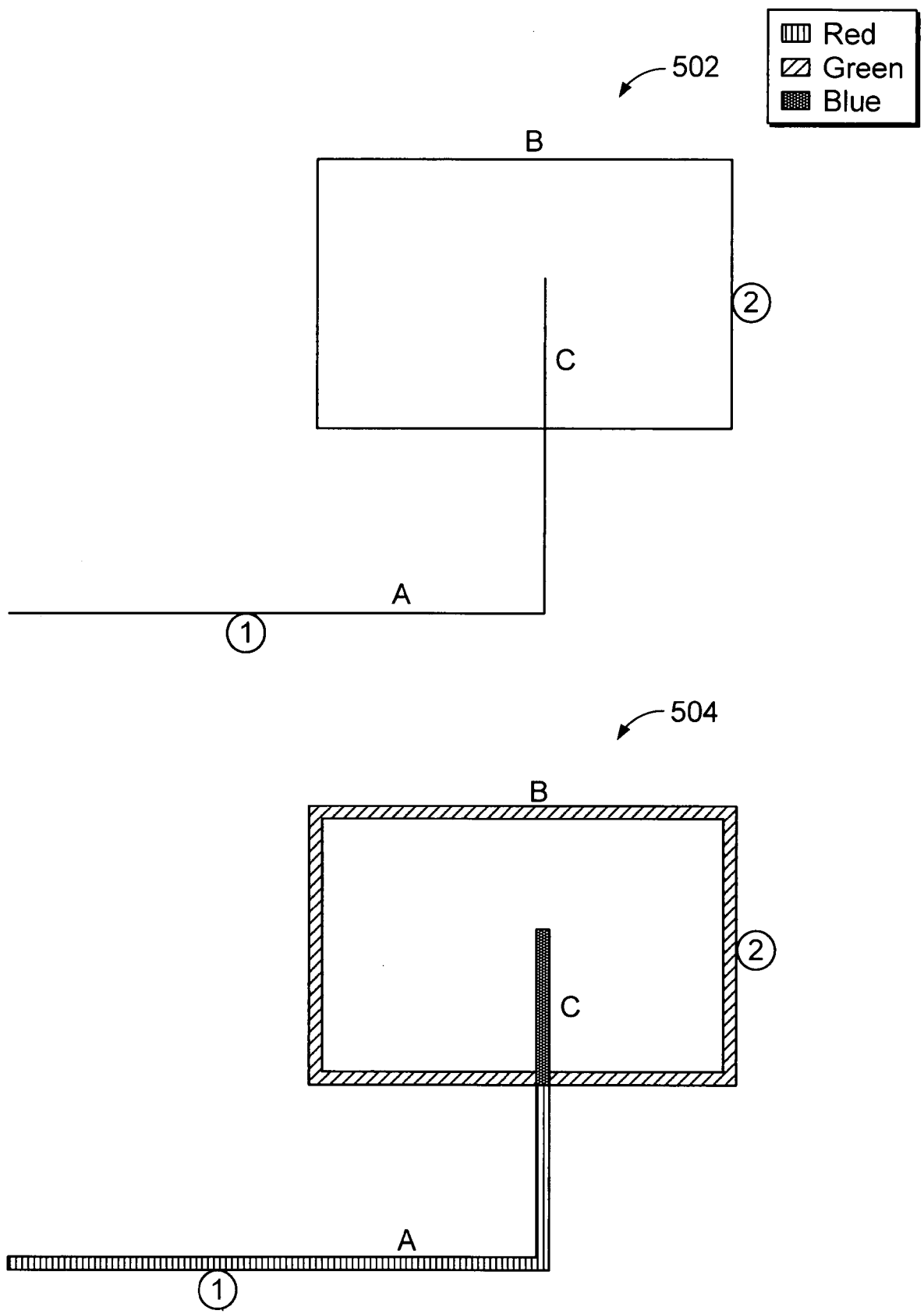
FIGS. 5A-B illustrate a drawing before and after a path addition.
Figure 5B:
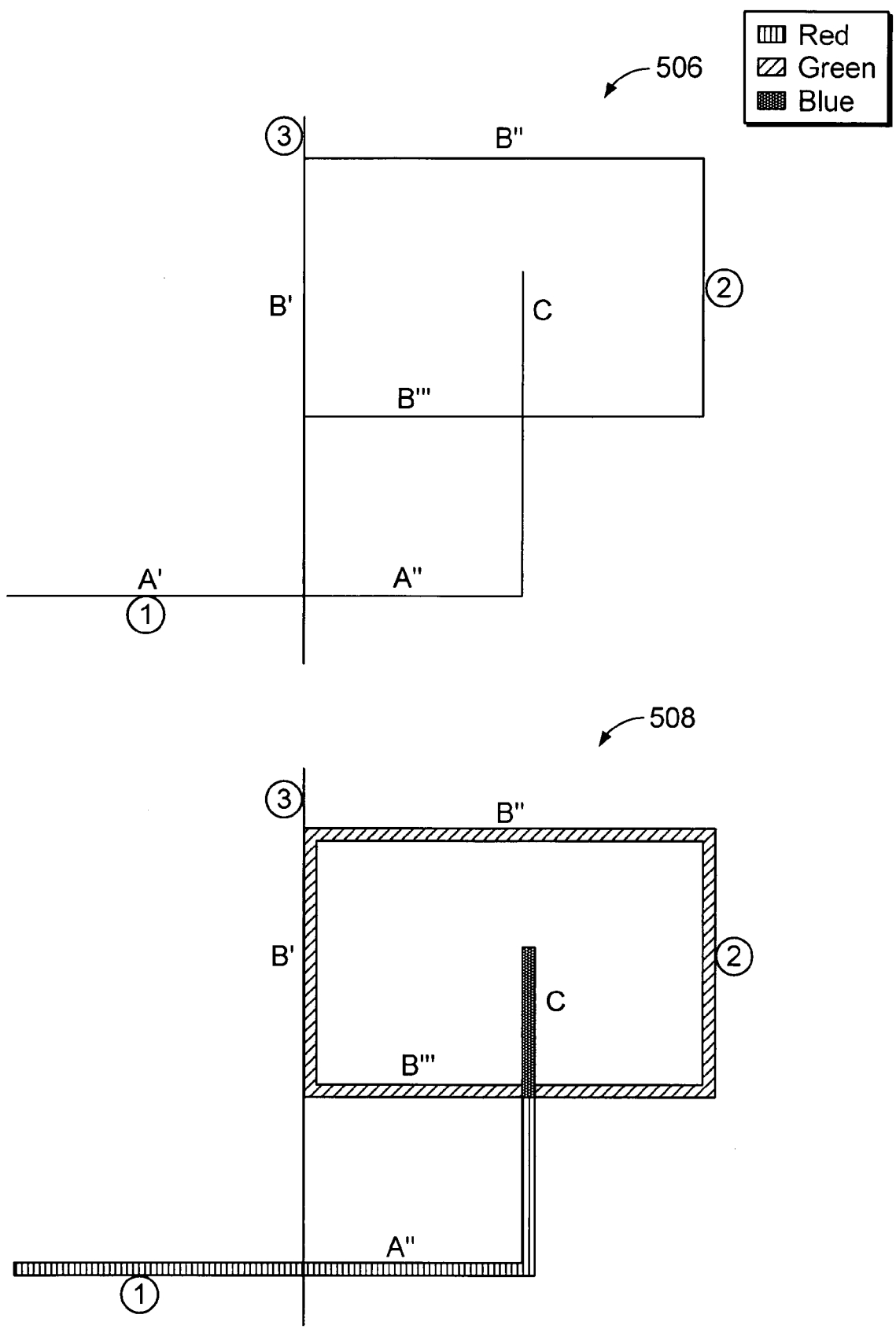

For example, FIGS. 5A-B illustrate a drawing before and after a path addition. In drawing 502, the two paths 1 and 2 define three subpaths, A, B, and C. In drawing 502, subpath A has been given attribute red, subpath B has been given attribute green, and subpath C has been given attribute blue. In drawing 506, a path, 3 is added to the set.

Drawing 508 shows how attributes can be assigned to the subpaths in drawing 506. Path 3 divides previous subpath A into two current subpaths, A' and A". These two subpaths are given the attributes of A (red). Path 3 also divides previous subpath B into B', B", and B'". These three subpaths are given the attributes of B (green). Subpath C is unchanged by the addition. There are four current subpaths along path 3. One of them, B', has already been given attributes as part of previous subpath B; the other three are not given attributes. The unattributed subpaths are still shown for illustrative purposes; if the attributes being used are visible attributes, they would become invisible.

Returning to FIG. 4, if a path has been removed (406), each pair of previous subpaths that were separated by that path are merged into a current subpath and given the attributes of whichever previous subpath in the pair was longest. If more than two subpaths are merged into a current subpath, then for each attribute, the lengths of all subpaths having that attribute is determined and totaled. The attribute associated with the greatest length is given to that current subpath.

Figure 6A:
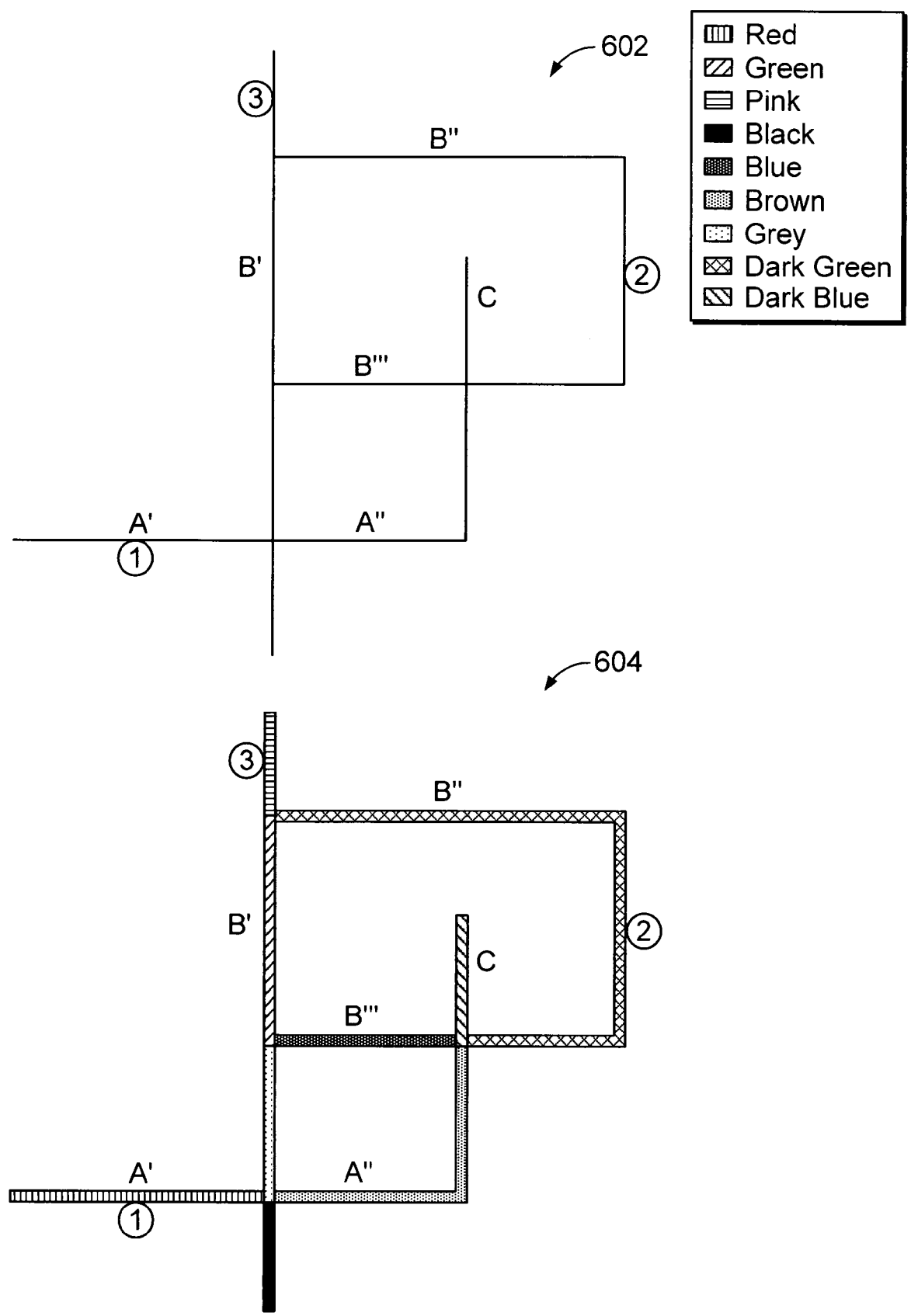
FIGS. 6A-B illustrate a drawing before and after a path removal.
Figure 6B:
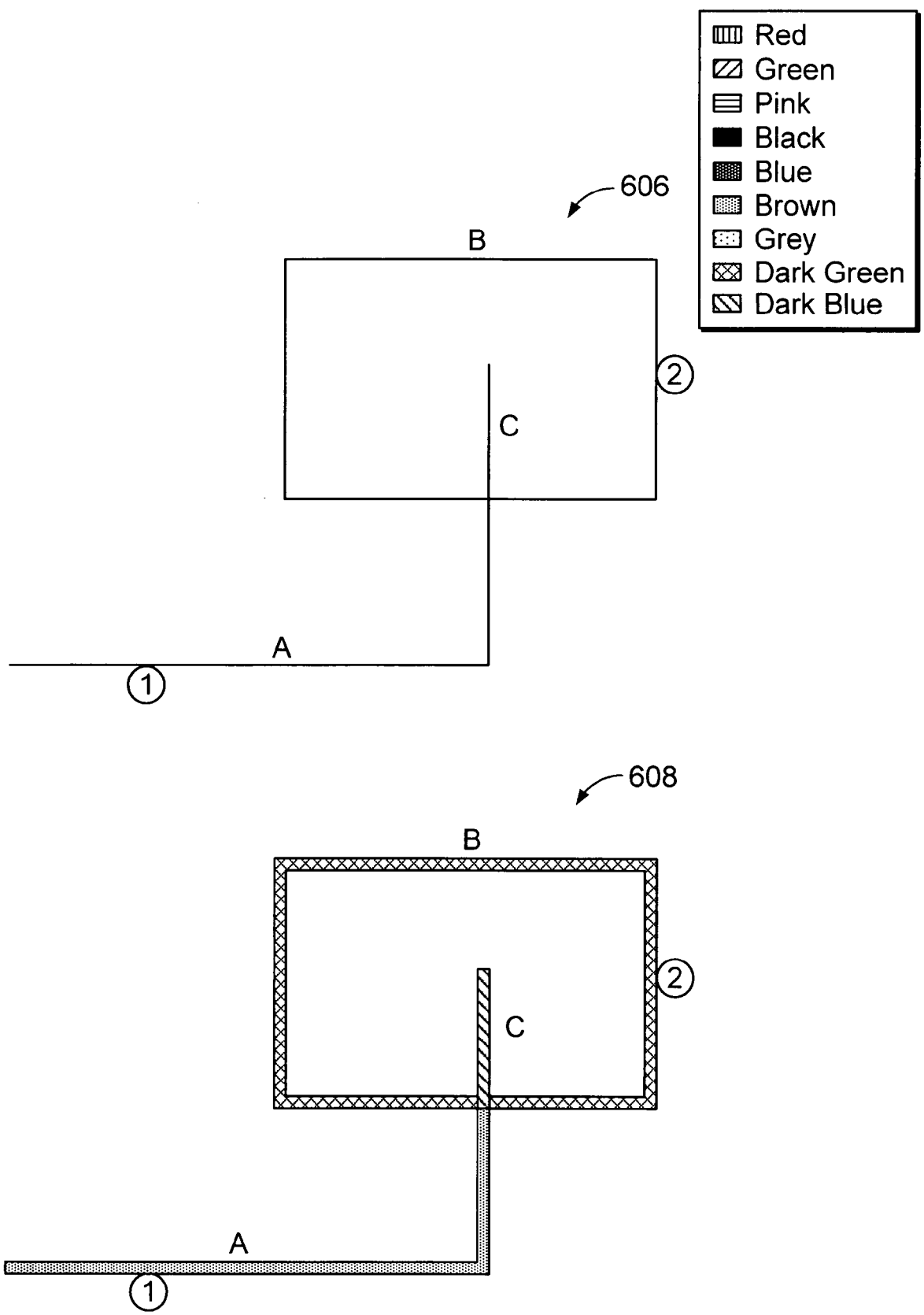

For example, FIGS. 6A-B illustrate a drawing before and after a path removal. In drawing 602, the three paths 1, 2, and 3 define subpaths A', A'', B', B'', B''', and C. In drawing 604, these subpaths have been given attributes as shown. In drawing 606, path 3 is removed from the set.

Drawing 608 shows how attributes can be assigned to the subpaths in drawing 606. When path 3 is removed from the set, the current subpath A is given the attributes of A'' (brown) because of the two previous subpaths A' and A'' that were divided by 3, A'' is the longest. Similarly, the current subpath B is given the attributes (dark green) of subpath B''. Subpath C remains unchanged.

Figure 7:
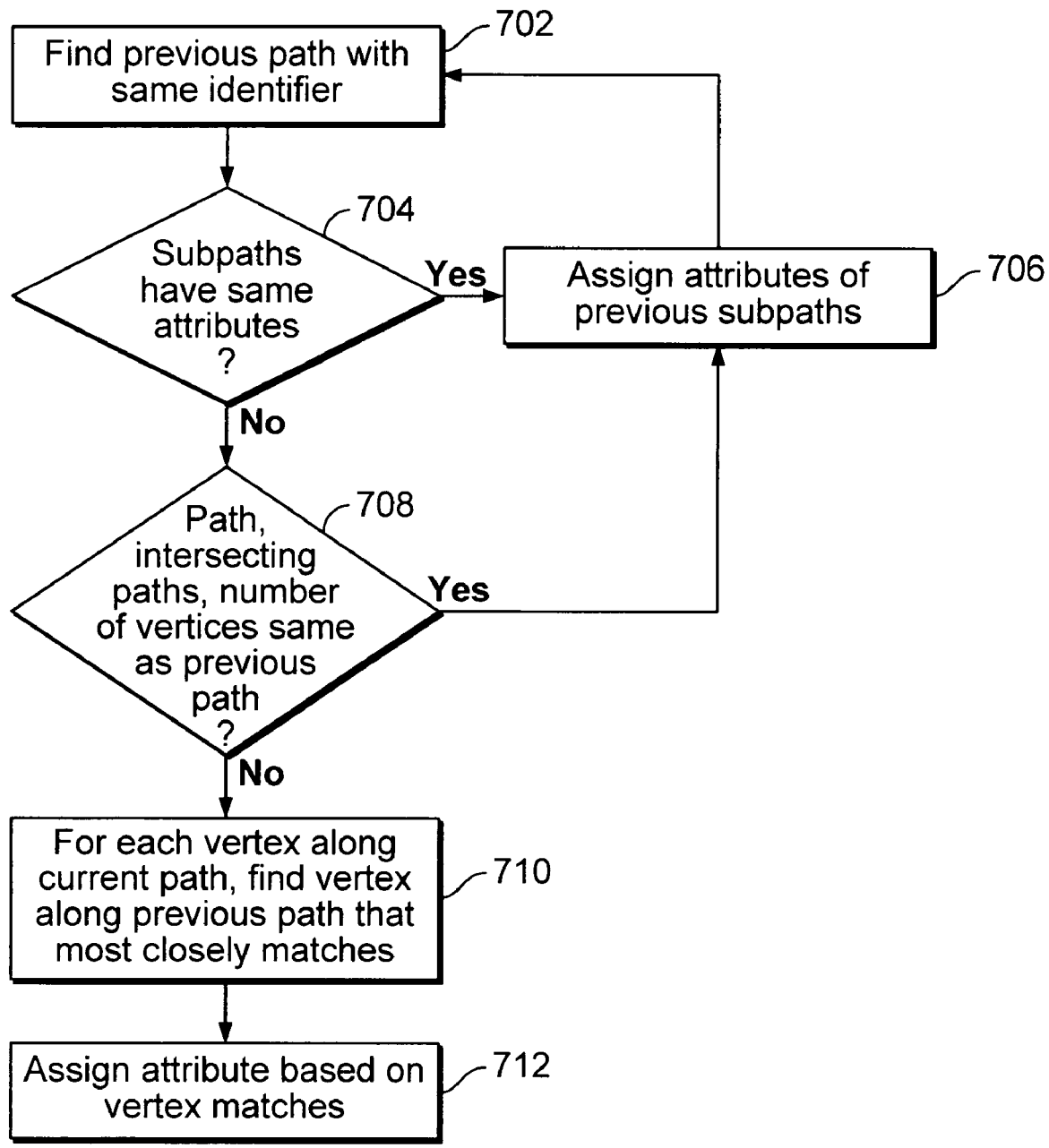
FIG. 7 is a flowchart illustrating a process of analyzing and assigning colors to current subpaths.

FIG. 7 is a flowchart illustrating a process of analyzing and assigning colors to current subpaths. In some embodiments, this process can be used to perform (304)-(310). In some embodiments, this process is performed for each current path that was not added. In this example, geometric attributes of subpaths are compared.

In this example, the path in the previous set with the same identifier is found (702). It is determined whether all subpaths along the previous path have the same attributes (704). If it is determined that all subpaths along the previous path have the same attributes, these attributes are assigned to all subpaths along the current path (706). The process returns to (702) for the next path.

If it is determined that all subpaths along the previous path do not have the same attributes, then it is determined whether the path, intersecting paths, and number of vertices are the same as the previous path (708). If the current path is identical to the previous path, and every path that intersects the current path is identical to the previous version of that path, and there are the same number of vertices along the current path and the previous path, the attributes of each subpath along the previous path are assigned to the corresponding subpath of the current path (706), in parameterization order. In this case, nothing has changed along the path. The process returns to (702) for the next path.

If it is determined that the path, intersecting paths, and number of vertices are not the same as the previous path, then for each vertex in the current path, the vertex in the previous path that most closely matches is found (710). Vertex matching is more fully described below. Attributes are assigned to the subpaths of the current path (712). In some embodiments, the attributes are assigned based on the vertex matches, as more fully described below. The process returns to (702) for the next path (not shown).

Figure 8A:
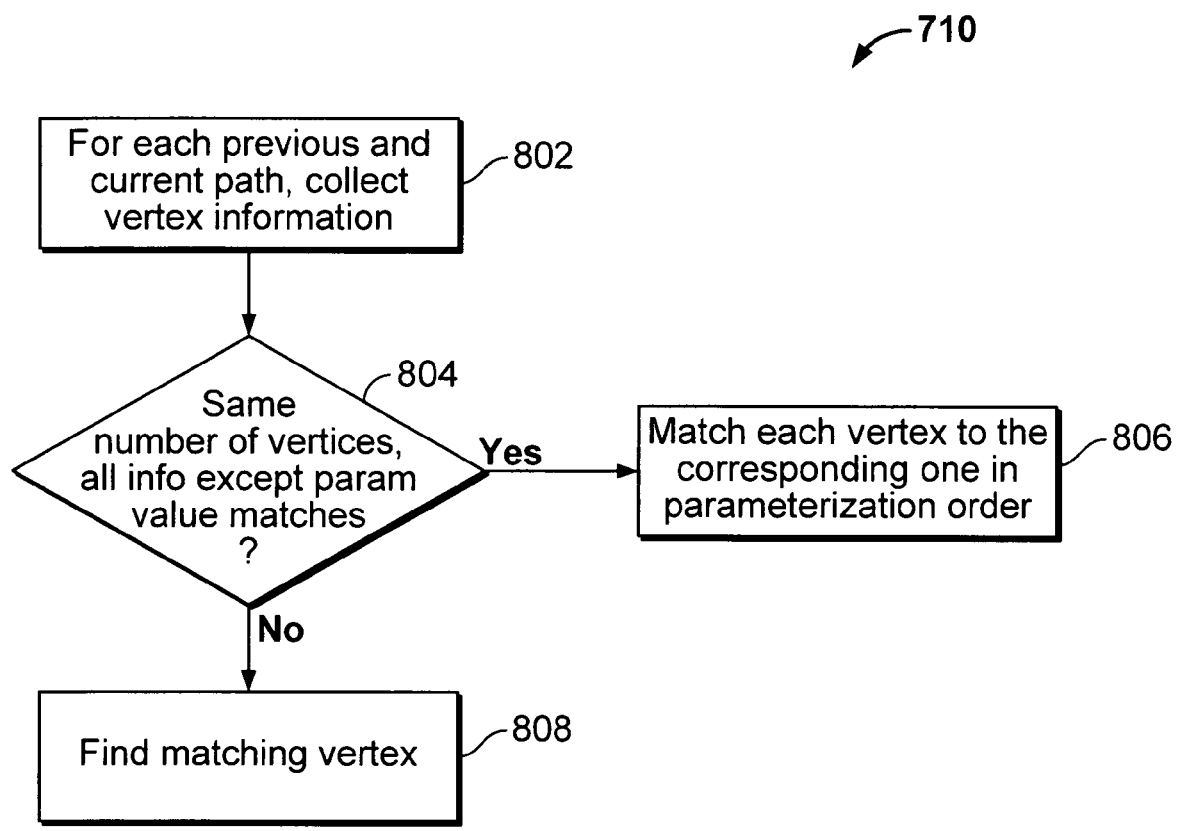
FIG. 8A is a flowchart illustrating a process of matching vertices.

FIG. 8A is a flowchart illustrating a process of matching vertices. In some embodiments, this process is used to perform (710). In this example, for each vertex along the previous path and the current path with the same identifier, vertex information is collected (802). The vertex information could include any information related to the direction, orientation, or relative location of an intersecting path at the vertex. In some embodiments, vertex information includes the following:

1. The value of the path's parameterization at the vertex and the identifiers of each path that goes through this vertex.

2. For each path that goes through the intersection, other than the path being examined at its current parameterization, it is determined:

2a. Whether it begins or ends at the vertex, and, if so, whether it proceeds to or comes from the left of the path being examined, to the right of the path being examined, or along the path being examined.

2b. Whether it crosses the path being examined at that vertex, and if so, whether it crosses from the left side of the path being examined, or the right side of the path being examined. A path that goes through an endpoint of the path being examined is also said to cross.

2c. Whether it "bounces" off the path being examined at that vertex (intersecting but not crossing), and, if so, whether it bounces off the left or the right.

The path being examined at its current parameterization is excluded because information does not need to be gathered for the path being examined unless it's a place where the path crosses itself, and then only for the parts of the path that cross.

3. For each path that goes through the intersection, the value of that path's parameterization at the vertex.

If the same path passes through the vertex multiple times, then information is gathered for each time. If the path being examined intersects itself at the vertex, information for the intersecting part of the path is also gathered multiple times if the path self-intersects multiple times at that vertex.

Figure 8B:
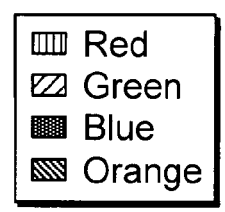
FIG. 8B illustrates a drawing before and after a modification.
Figure 8B:
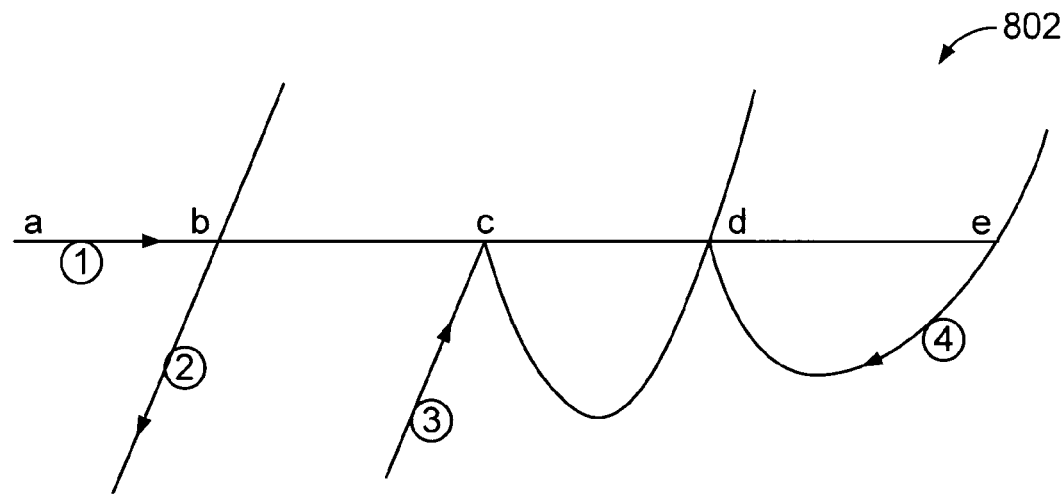
Figure 8B:
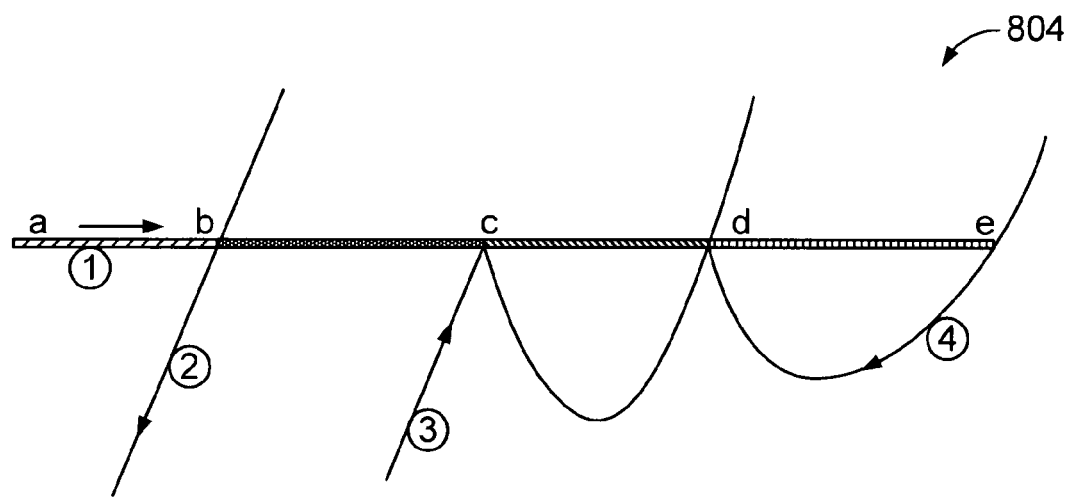
Figure 8B:
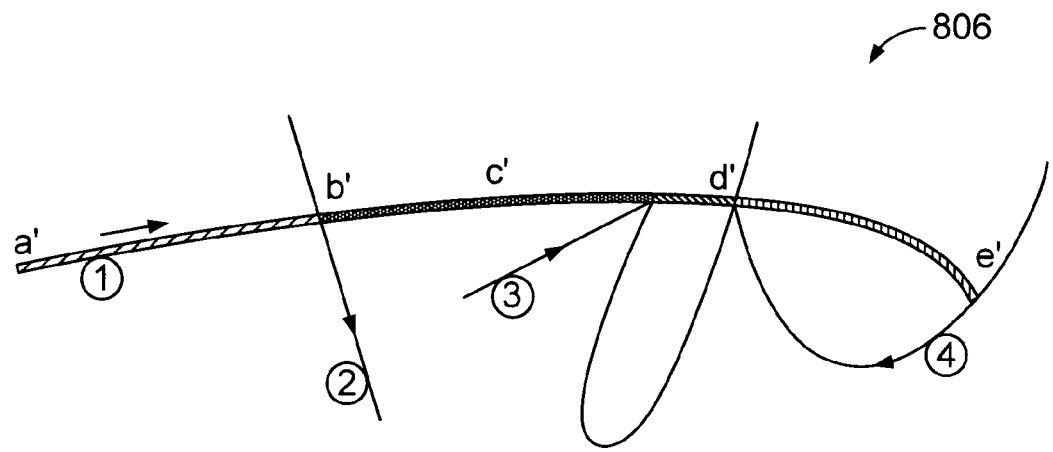

For example, FIG. 8B illustrates a drawing before and after a modification. In this example, drawing 802 shows the drawing without subpath attributes, before modification. Drawing 802 is shown to include paths 1-4, and vertices a-e. Drawing 804 shows the drawing with colors assigned to the subpaths along path 1, before modification. Drawing 806 shows the drawing after the paths are modified, with attributes assigned according to the process of FIG. 7.

In this example, all paths have arrows associated with them to show their directions. At 802, the following information is collected for each vertex of path 1:

a: parameter value 0
no intersecting paths
b: parameter value t1
path 2 intersects, crossing from left to right.
c: parameter value t2
path 3 intersects, bouncing off on the right
d: parameter value t3
path 3 intersects, crossing from right to left
path 4 ends, coming from the right
e. parameter value t4
path 4 intersects, crossing from left to right Returning to FIG. 8A, the information gathered for the previous path and current path, sorted in parameterization order, is compared (804). If is determined that both the previous and current paths have the same number of vertices, and, for each vertex, all information other than the parameterization value matches, each vertex is matched to the corresponding one (806) in parameterization order. In this case, the paths have changed, but the order and way in which they intersect have not changed.

For example, in drawing 806, since the information for the vertices along the current path 1 is the same as the information for the vertices along previous path 1 in drawing 804, the vertices are matched in order, (and, as described below, the attributes of the subpaths are also copied in order.)

Returning to FIG. 8A, if is determined that both the previous and current paths do not have the same number of vertices, or, for each vertex, all information other than the parameterization value does not match, a matching vertex is found for each vertex along the current path (808).

Figure 8C:
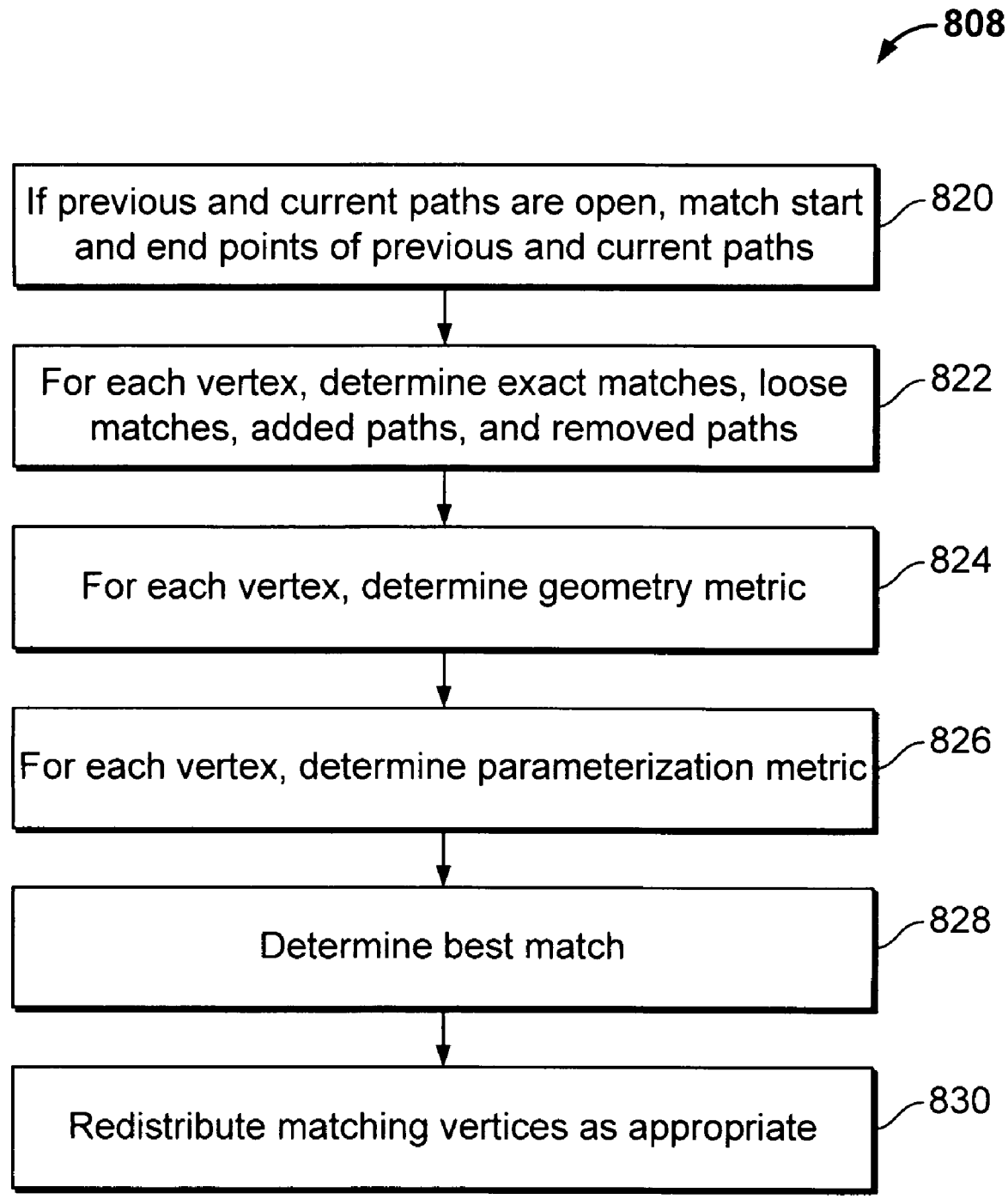

FIG. 8C is a flowchart illustrating a process for finding a matching vertex. In some embodiments, this process is used to perform (808). In this example, a previous and current path with the same identifier are compared. For each vertex along the current path, a matching vertex along the previous path is found.

In this example, if the previous and current paths are open, start and end points of the previous and current paths are matched (820). If the current path is not closed, and the previous path is not closed, then the start point of the previous path is the match for the start point of the current path, and the end point of the previous path is the match for the end point of the current path.

For each vertex that does not yet have a match, exact matches, loose matches, added paths, and removed paths are determined (822). In some embodiments, the number of exact matches is the number of paths going through the vertex that match exactly in terms of identifier, crossing vs. bouncing vs. start/end, and direction. The number of loose matches is the number that go through the vertex that match by identifier but not by crossing vs. bouncing vs start/end, or direction. The number of added paths is the number of paths that go through the current vertex but not the previous vertex. The number of removed paths is the number of paths that go through the previous vertex but not the current vertex.

A geometry metric is determined for each vertex (824). The geometry metric can be any measure of how well geometric attributes of the vertices match. In some embodiments, the geometry metric is 3 if there are no exact or loose matches. Otherwise the geometry metric is the quantity (exact-matches+loose-matches)/(exact-matches+
loose-matches+added-paths+removed-paths)

plus the quantity (exact-matches)/(exact-matches+loose-matches)

The result is subtracted from 2. This metric varies from 0 (exact) to 2 (poor).

The quantity exact-matches+loose-matches is the total number of matches. The first term (exact-matches+loose-matches)/(exact-matches+
loose-matches+added-paths+removed-paths)

is the fraction of paths going through the vertex that are either exact or loose matches. The second term (exact-matches)/(exact-matches+loose-matches)

is the fraction of the matches that are exact. Each of these can vary from 0 to 1. The geometry metric can get up to 1 point for having all the paths be matching, and up to an additional 1 point for having the matches be exact. Subtracting the sum from two causes 0 be the best and 2 be the worst. The value 3, an even larger value, is used when there are no matches at all. The smaller the geometry metric, the better the match.

A parameterization metric is determined for each vertex (826). The parameterization metric can be any measure of how close two vertices are to each other. In some embodiments, the parameterization metric is he sum of the absolute values of the difference between the parameterization value for each previous matching path and the corresponding current matching path, all added to the absolute value of the difference between the parameterization values of the previous path at this vertex, and the current path at this vertex. This varies from 0 (good) and continues up (the larger, the poorer).

The parameterization metric is a way of determining how close together two vertices are. If the same path crosses the path being examined several times, there may be several vertices that have the same geometry metric. The parameterization metric indicates which of these vertices is the closest match.

The best match is determined based on the geometry metric and/or parameterization metric (828). Any appropriate rules can be used. In some embodiments, for any two vertices, the one with the lower geometry metric is the better match. If the geometry metrics are the same, the one with the lower parameterization metric is the better match. If the geometry and parameterization metrics are the same, the vertices are equally good (or poor) matches.

Figure 9:
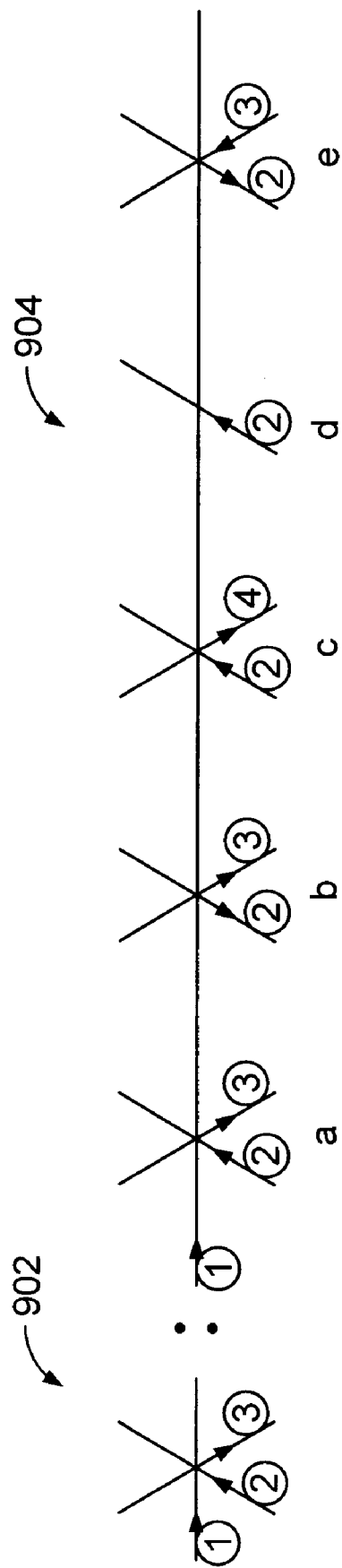
FIG. 9 illustrates a drawing having a vertex and candidate matching vertices.

FIG. 9 illustrates a drawing having a vertex and candidate matching vertices. In this example, drawing 902 includes three paths 1-3 intersecting at a vertex. Drawing 904 includes five candidate matching vertices, vertex a-e. In this example, the vertex in drawing 902 is matched to each of the candidate vertices along path 1 in drawing 904. The following are the geometry metric values:

a: 2 exact matches, 0 loose matches, 0 added, 0 removed

Geometry match: $(2+0)/(2+0+0+0)+(2/(2+0))=1+1=2$
then $2-2=0$ (exact)

b: 1 exact match (path 3), 1 loose match (path 2), 0 added, 0 removed

Geometry match: $(1+1)/(1+1+0+0)+(1/(1+1))=1+0.5$
$=1.5$ then $2-1.5=0.5$ c: 1 exact match (path 2), 0 loose matches, 1 added (path 4), 1 removed (path 3)

Geometry match: $(1+0)/(1+0+1+1)+(1/(1+0))=0.333+$
$1=1.333$ then $2-1.333=0.667$ d: 1 exact match (path 2), 0 loose matches, 0 added, 1 removed (path 3)

Geometry match: $(1+0)/(1+0+1+0)+(1/(1+0))=0.5+$
$1=1.5$ then $2-1.5=0.5$ e: 0 exact matches), 2 loose matches, 0 added, 0 removed Geometry match: $(0+2)/(1+1+0+0)+(0/(1+1))=1+0=1$
then $2-1=1$ The matches, from best to worst, are a, b & d (tie), c, e. If the choice came to choosing between b and d, the parameterization metric would break the tie in this example.

Returning to FIG. 8C, the matching vertices are redistributed as appropriate (830). If the current path is open, ranges of vertices on the current path that are between matches with geometry metric of 0, or, between an endpoint match and a match with geometry metric of 0, or, if there are no such ranges, between the endpoint matches are found. For each such range, the range of vertices in the previous path that are between the vertices that match the ends of the range are found, and the matching vertices in the current range are redistributed as follows:

1. If there are the same number of vertices in the current range as in the previous range, or fewer vertices in the current range than in the previous range, each vertex in the current range is matched to a different vertex in the previous range.

2. If there are more vertices in the current range than in the previous range, each vertex in the previous range is matched once.

3. Whether 1 or 2 was taken, no vertex in the current range matches a vertex in the previous range that is closer in parameterization value to the start of the previous range than the current vertex before it in parameterization value.

4. The match is the best match using the metrics described in (824) and (826).

When looking for places between good matches on the current path, this is one way to ensure the following:

1. If there are the same or fewer vertices in the current range, no match is to the same previous vertex.

2. If there are more vertices in the current range, each previous vertex is used.

3. The matches never "cross".

4. It is the best such match.

In other words, this ensures that the matches do not "bunch up".

Figure 10A:
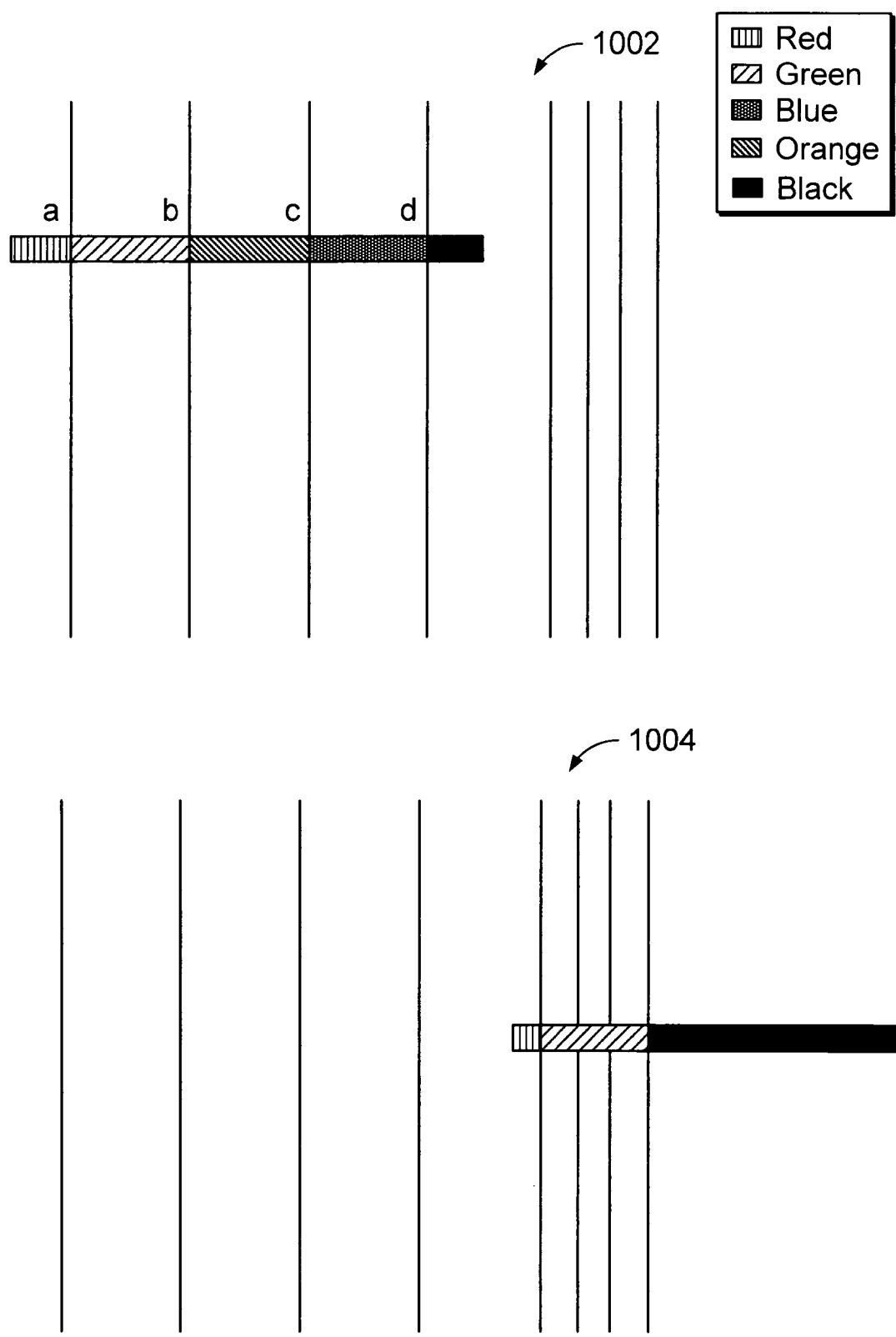
FIGS. 10A-B illustrate a drawing before and after an edit.
Figure 10B:
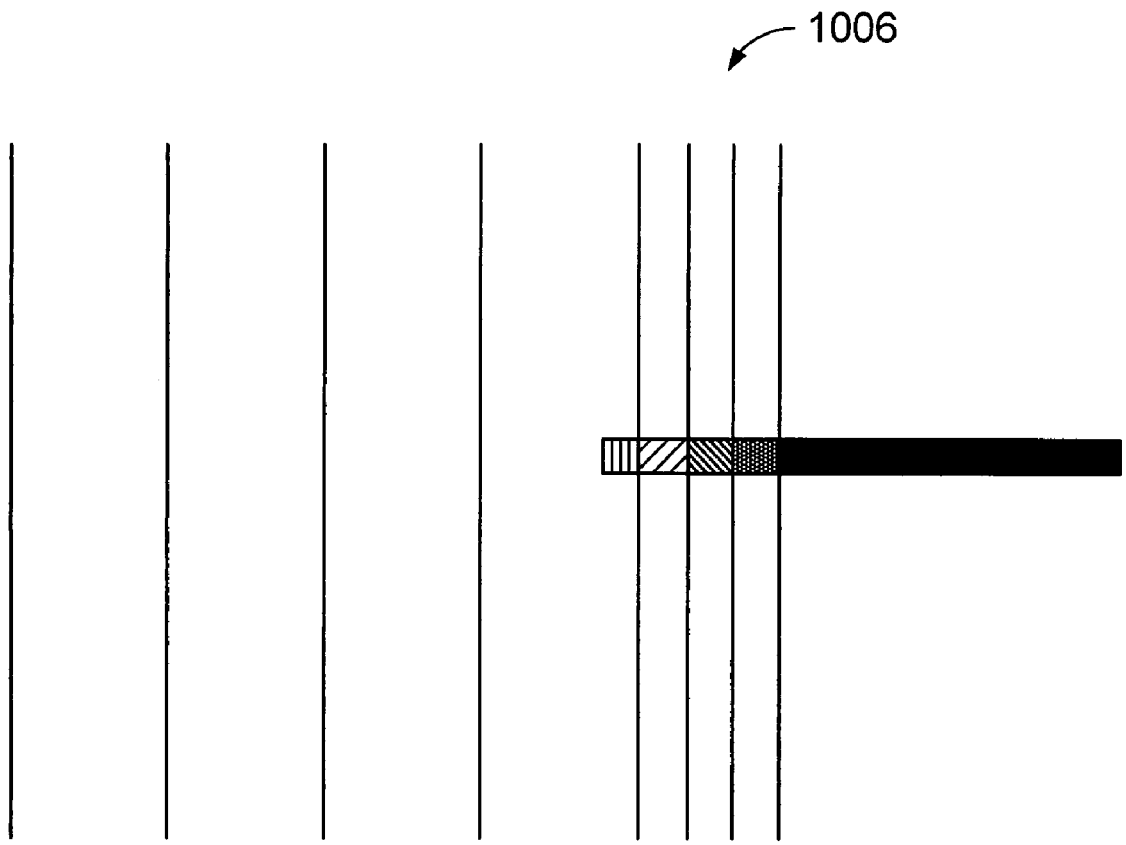

FIGS. 10A-B illustrate a drawing before and after an edit. In this example, the horizontal line of drawing 1002 is moved to intersect a current set of lines. There are no good matches (geometry metric 0) except the endpoint matches because the current vertices have no paths in common with the previous vertices. All matches have geometry metric=3, so parameterization metrics break the tie. (828) would result in the first two intersections from left to right in the current paths being matched to vertex a in the previous paths because they are the closest ones along the previous path to where the vertices are on the current path. Similarly, the last two intersections would be matched to vertex b. As more fully described below, this matching results in the assignment shown in drawing 1004, which may be undesirable. To make the matches more even, so that the four current vertices match previous vertices a, b, c, and d, as shown in drawing 1006, the matches can be redistributed according to (830).

Figure 11A:
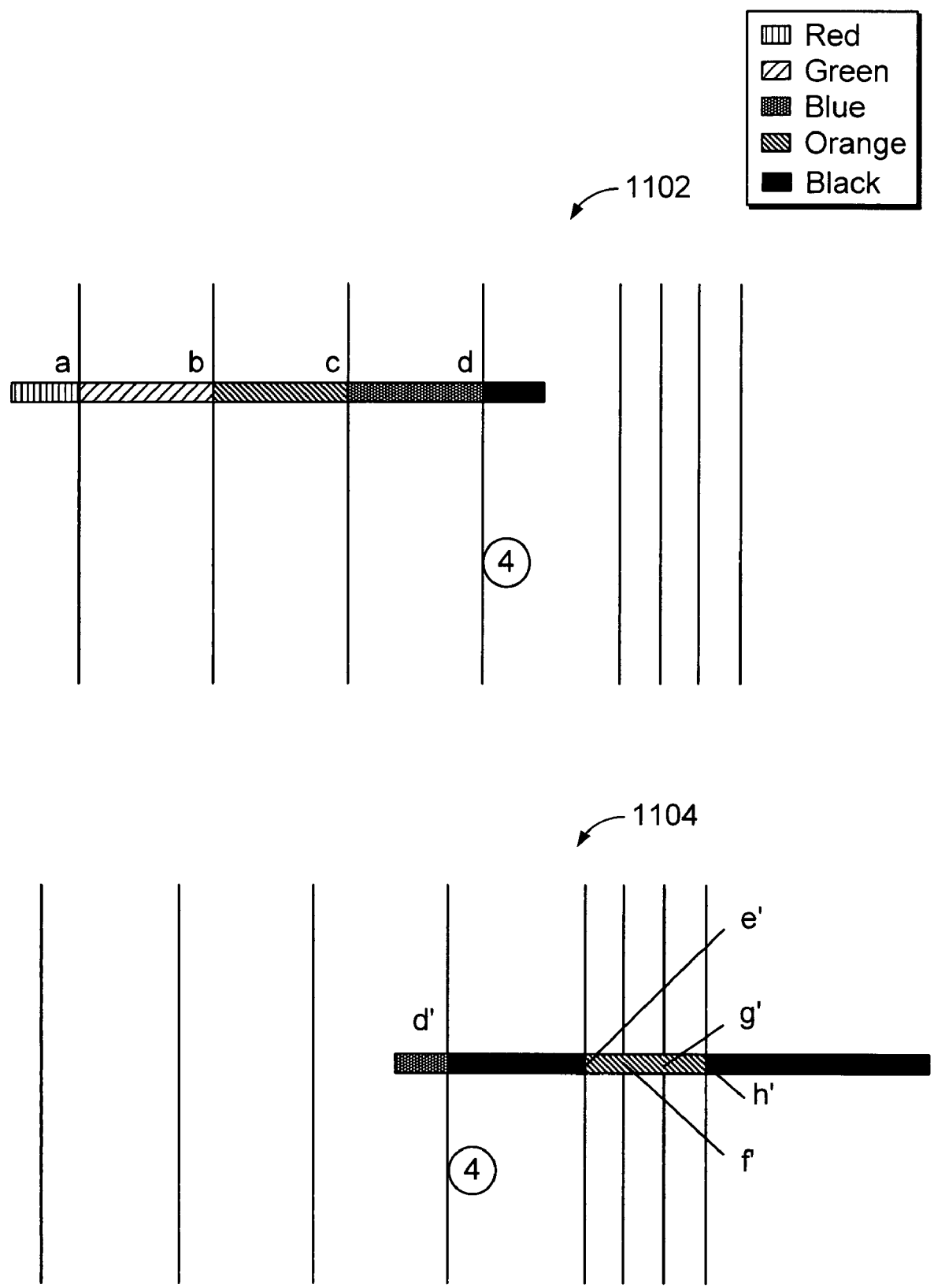
FIGS. 11A-B illustrate a drawing before and after an edit.
Figure 11B:
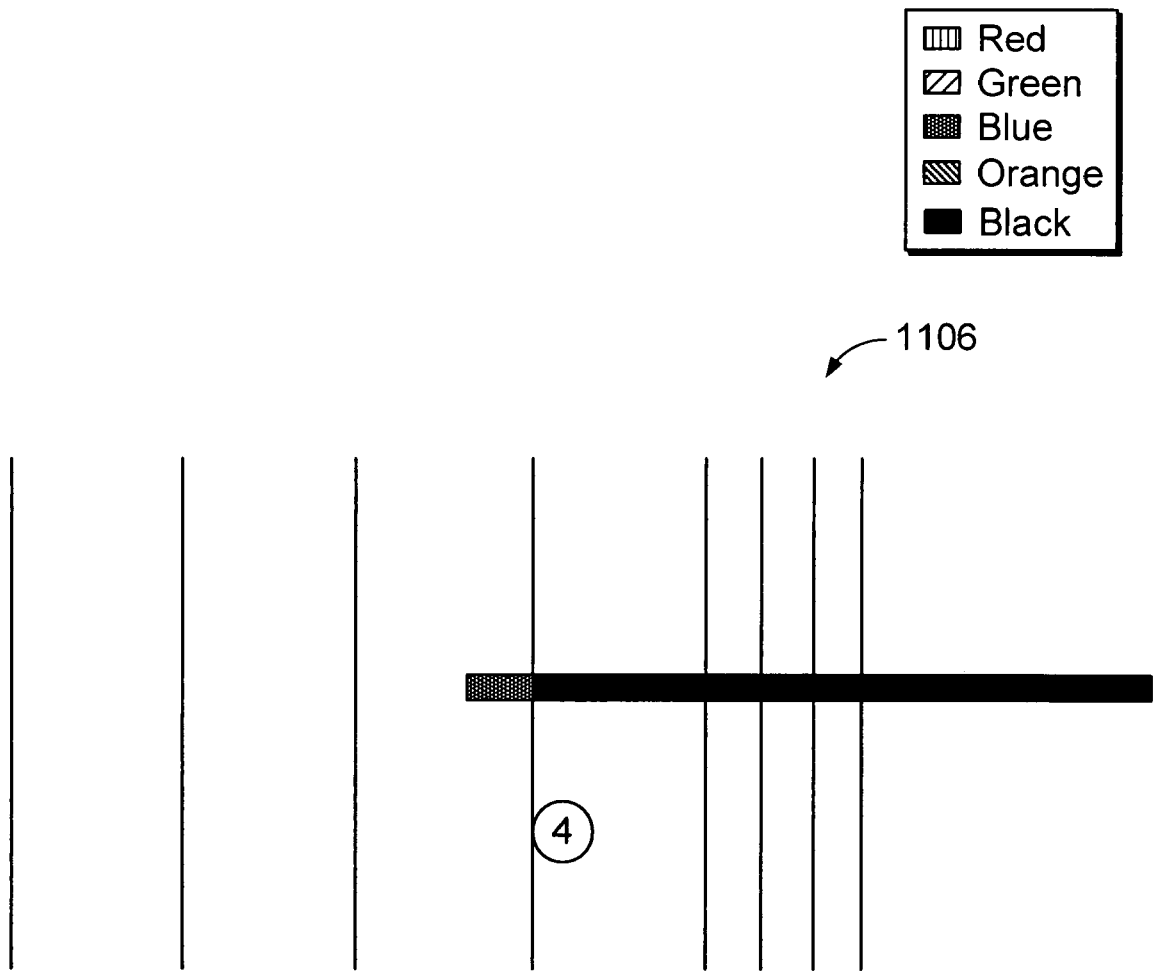

FIGS. 11A-B illustrate a drawing before and after an edit. In this example, the horizontal line of drawing 1102 is moved so that it continues to intersect vertical line 4, but none of the other lines it previously intersected. So the match at current vertex d' is an exact match to previous vertex d (geometry metric=0), but the intersections with the closely spaced lines have poor matches because the horizontal line did not previously intersect them (geometry metric=3). The first two intersections with the closely spaced lines (e' and f') would match to vertex b, and the last two (g' and h') would match to vertex c. As more fully described below, this results in the assignment shown in drawing 1104, with the orange subpath apparently "jumping" into the middle of the black subpath. (A result of the matches crossing.) Redistributing the matches between d' and the end point matches them all to vertex d, resulting in the improved assignment shown in drawing 1106.

In the case of closed paths, the ranges distributed can wrap around from the end of the path to the beginning. If a closed path has only one vertex with a geometry metric of 0, the redistributed range begins at that vertex, wraps around, and also ends at that vertex. If a closed path has no vertices with a geometry metric of 0, all vertices can be redistributed.

Figure 12A:
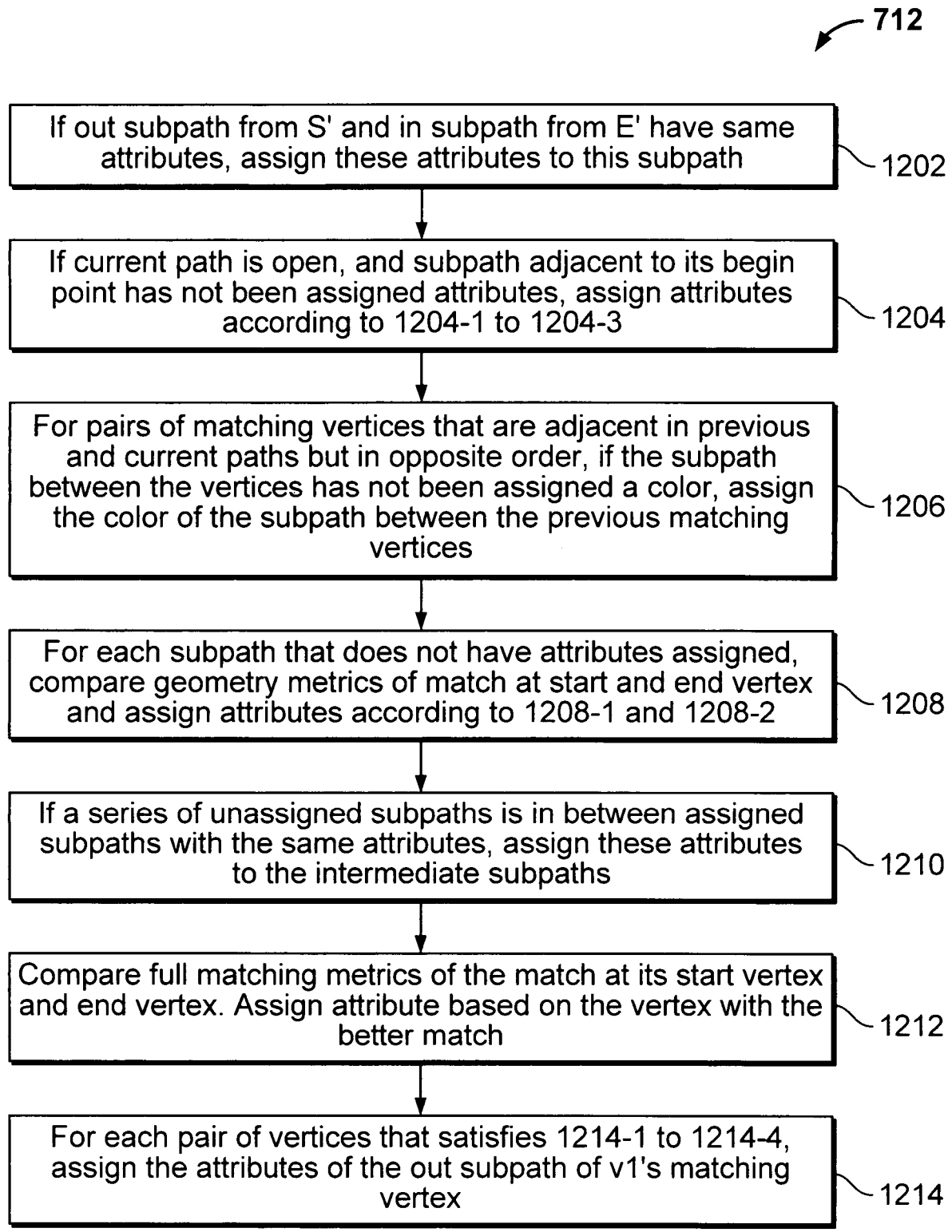
FIG. 12A is a flowchart illustrating a process for assigning an attribute to a subpath.

FIG. 12A is a flowchart illustrating a process for assigning an attribute to a subpath. In some embodiments, this process is used to perform (712). In this example, each subpath has a start vertex S (the vertex of the subpath that has a smaller parameterization value) and an end vertex E (the vertex of the subpath that has a larger parameterization value). Each vertex has an subpath going into it on the path being assigned (called the vertex's "in subpath" and an subpath going out of it on the path being assigned (called the vertex's "out subpath"). For each subpath on the current path, let the previous vertex that matches vertex S be called S' and the previous vertex that matches vertex E be called E'.

If the out subpath from S' and the in subpath from E' have the same attributes, or are the same subpath, these attributes are assigned to this subpath (1202).

Figure 12B:
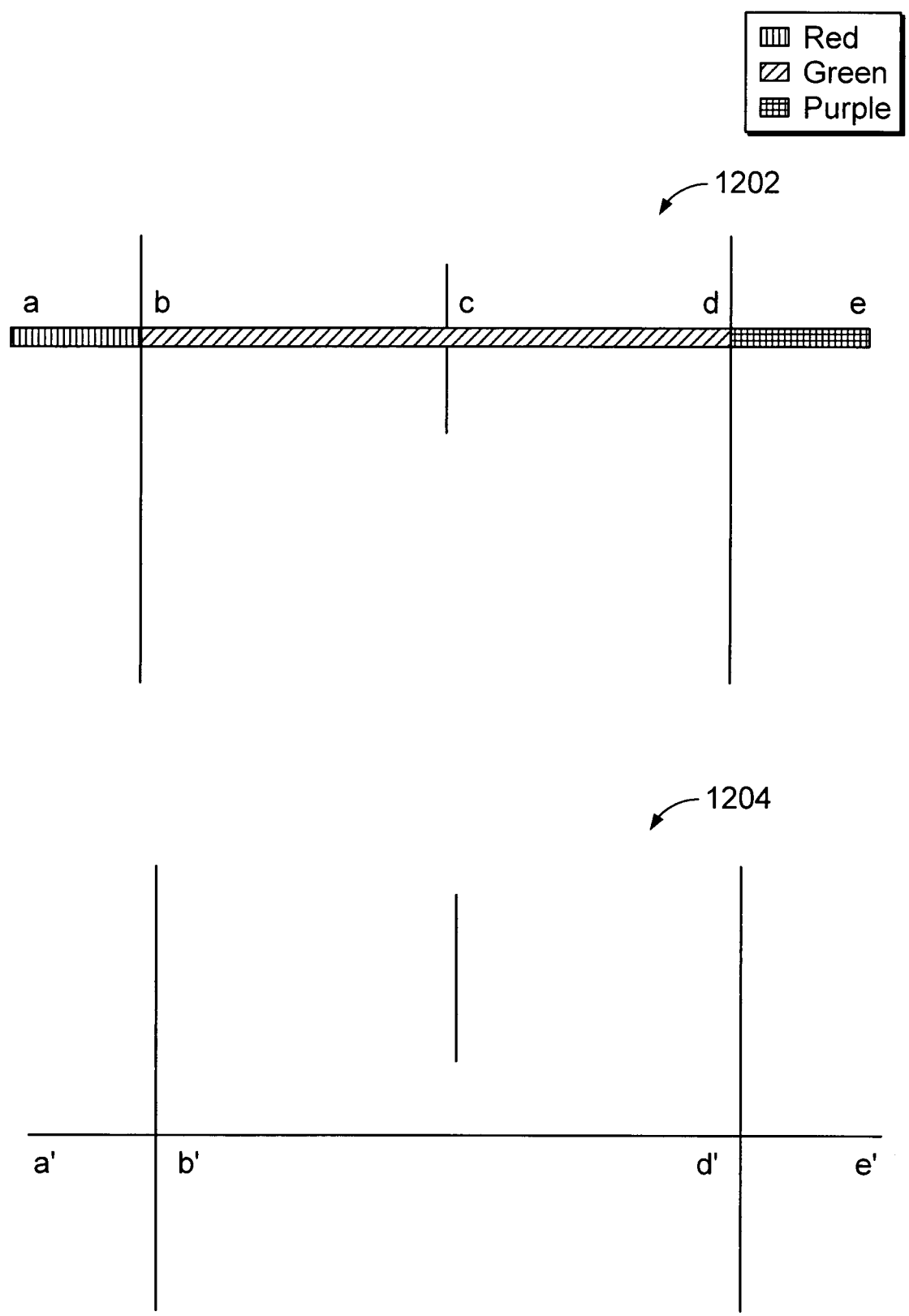
FIGS. 12B-C illustrate a drawing before and after moving a path and assigning subpath colors.
Figure 12C:
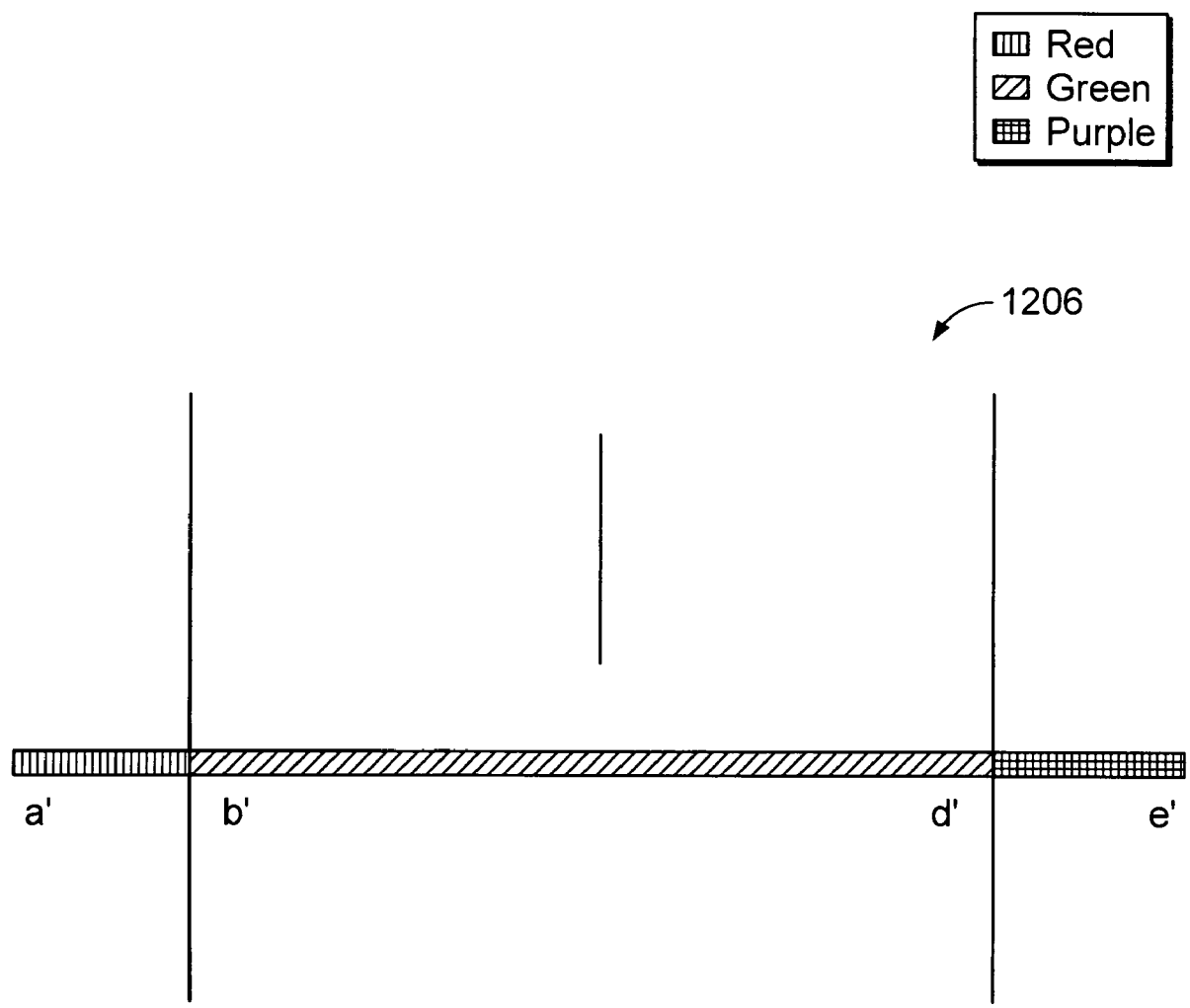

For example, FIGS. 12B-C illustrate a drawing before and after moving a path and assigning subpath colors. In this example, the horizontal line of drawing 1202 is moved down out of intersection with the short vertical line. Drawing 1204 shows the drawing after the edit but before color assignment. The vertices a', b', d', and e' along the current path are matched to previous vertices a, b, d, and e, respectively.

For the current subpath between a' and b', the color of the out subpath of a (the match to a') and the color of the in subpath of b (the match to b') are the same color, red. (In fact, they are the same subpath.) The subpath between a' and b' is assigned red.

For the current subpath between b' and d', the color of the out subpath of b (the match to b') and the color of the in subpath of d (the match to d') are the same color, green. (This time they are not the same subpath.) So the subpath between b' and d' is assigned green.

For the current subpath between d' and e', the color of the out subpath of d (the match to d') and the color of the in subpath of e (the match to e') are the same color, purple. (In fact, they are the same subpath.) So the subpath between d' and e' is assigned purple. The result in drawing 1206.

Returning to FIG. 12A, if the current path is not closed, and the subpath adjacent to its begin point has not been assigned attributes, attributes are assigned as follows (1204):

1204-1. If the start vertex of the current path has moved, and the first vertex along the current path that does not match the previous start vertex has a matching vertex with a sufficiently good geometry metric (e.g., less than or equal to 1), the attributes of the in subpath of this first vertex are assigned to the branch adjacent to the start vertex.

1204-2. Otherwise the subpath is assigned the attributes of the subpath adjacent to the start vertex of the previous path.

1204-3. The same attributes are assigned to each subpath in order that has an end vertex matching to the begin point of the previous path.

Figure 13A:
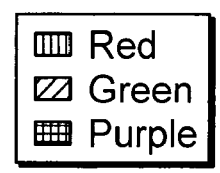
FIGS. 13A-B illustrate a drawing before and after various edits.
Figure 13A:
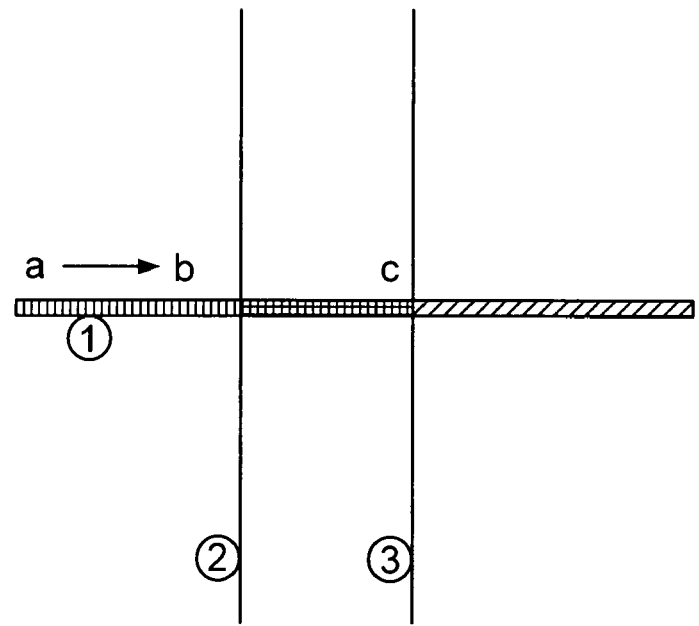
Figure 13A:
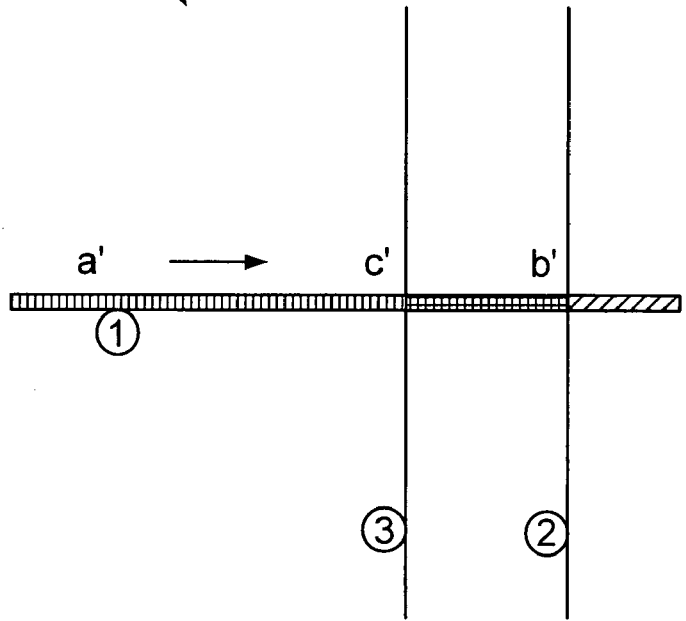
Figure 13B:
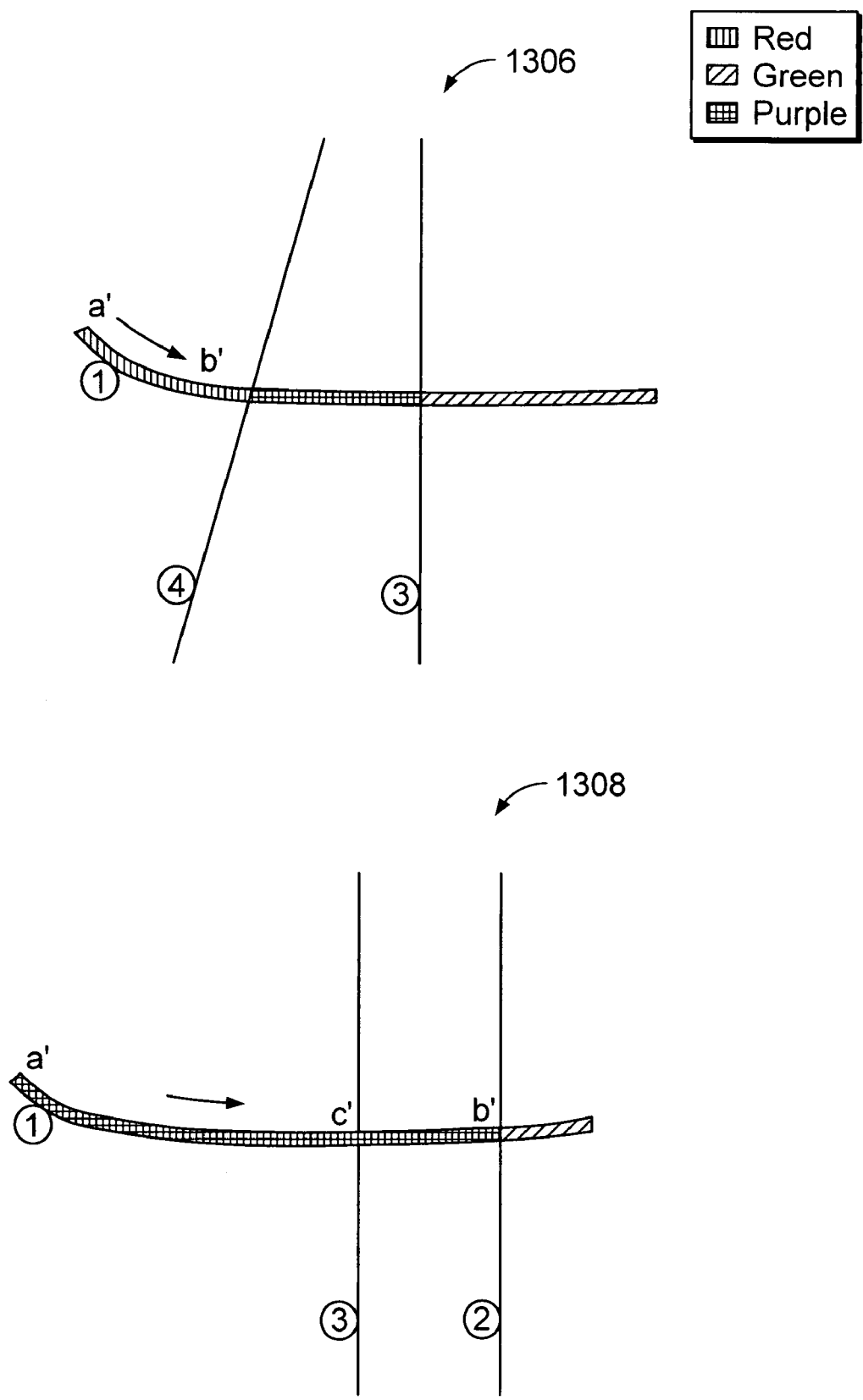

For example, FIGS. 13A-B illustrate a drawing before and after various edits. In this example, the drawing 1302 is modified in three ways:

In drawing 1304, the start vertex has not moved. The first subpath is assigned the color of the previous first subpath (red).

In drawing 1306, the start vertex has moved, but the next vertex b' has a poor match (it is path 4 instead of path 2). The first subpath is assigned the color of the previous first subpath (red).

In drawing 1308, the start vertex has moved and the next vertex is a good match. The first subpath is assigned the color of the subpath going into vertex c (purple).

Returning to FIG. 12A, if the current path is not closed, and the subpath adjacent to its end point has not been assigned attributes, assign attributes as follows (1205):

1205-1. If the end vertex of the current path has moved, and the last vertex along the current path that does not match the previous end vertex has a matching vertex with a sufficiently good geometry metric (e.g., less than or equal to 1), the attributes of the out subpath of this last vertex are assigned to the branch adjacent to the end vertex.

1205-2. Otherwise the subpath is assigned the attributes of the subpath adjacent to the end vertex of the previous path.

1205-3. The same attributes are assigned to each subpath in order that has start vertex matching to the end point of the previous path.

Pairs of matching vertices that are adjacent in both the previous and current paths, but in the opposite order, are found. (In other words, in parameterization order, the previous path has vertex v1 immediately followed by v2, and the current path has vertex v2' immediately followed by v1'.) For every such pair, if the subpath between the vertices has not yet been assigned a color, the color of the subpath between the previous matching vertices is assigned. (1206)

For example, in FIGS. 13A-B, the vertices c' and b' in drawing 1304 are in the opposite order from the vertices b and c. The subpath between c' and b' is assigned the color of the subpath between b and c (purple).

Returning to FIG. 12A, for each subpath that does not yet have attributes assigned, the geometry metrics of the match at its start vertex and its end vertex are compared and attributes are assigned as follows (1208):

1208-1. If the start vertex has a better geometry match, or if the vertices have equally good matches and the start vertex is closer in position to its match than the end vertex is to its match, the attribute of the out subpath of the start vertex's match is assigned to the subpath.

1208-2. If the end vertex has a better geometry match, or if the vertices have equally good matches and the end vertex is closer in position to its match than the start vertex is to its match, the attribute of the in subpath of the end vertex's match is assigned to the subpath.

Figure 14A:
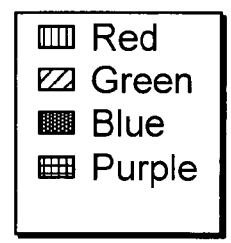
FIGS. 14A-B illustrate a drawing before and after a path edit.
Figure 14A:
Figure 14A:
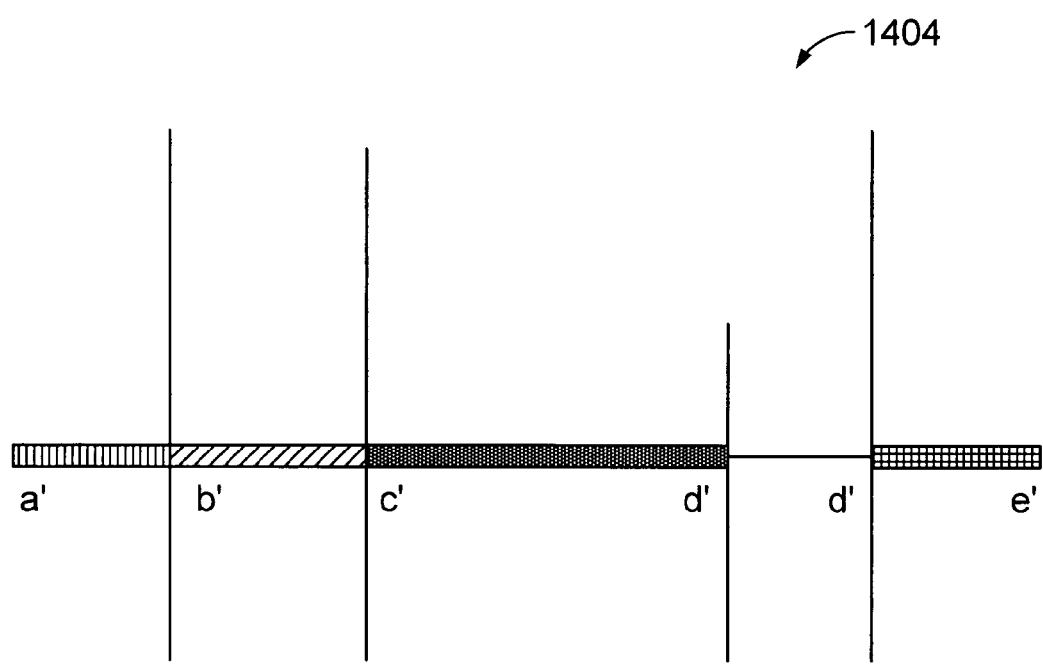
Figure 14B:
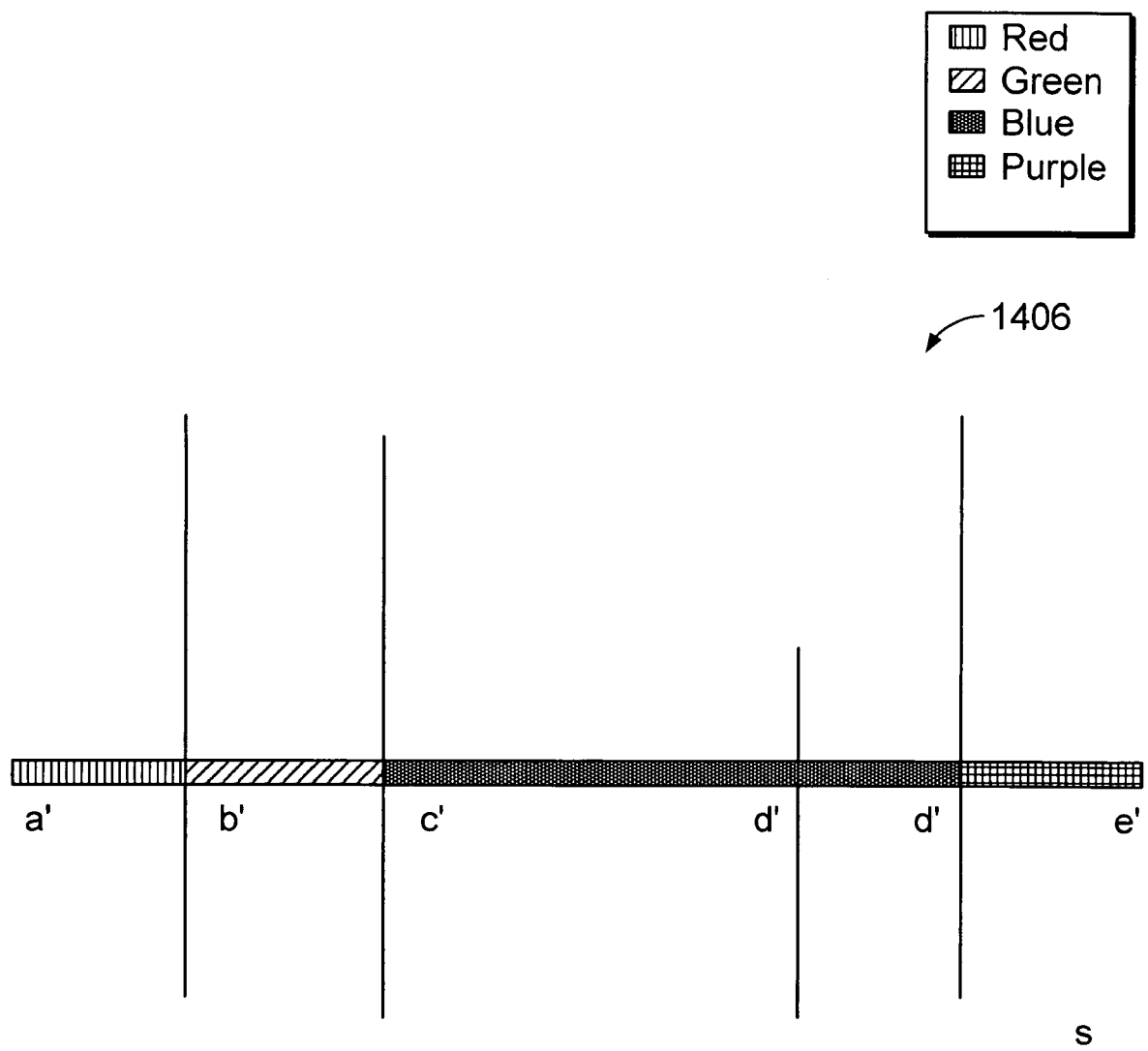

For example, FIGS. 14A-B illustrate a drawing before and after a path edit. In this example, the horizontal line of drawing 1402 is moved. The two vertices d' are both matched to previous vertex d. The subpath between these vertices has not yet been assigned, as shown in drawing 1404. Both d' vertices have equally good geometry matches to d the original paths, but the rightmost d' is closer in position to the original d. So the subpath is assigned the color of the subpath going into d (blue), as shown in drawing 1406.

Returning to FIG. 12A, if a series of unassigned subpaths is in between assigned subpaths with the same attributes, these attributes are assigned to the intermediate subpaths (1210).

Figure 15:
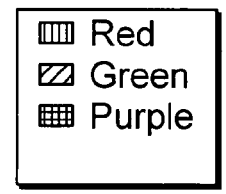
FIG. 15 illustrates a drawing having a partially assigned path.
Figure 15:
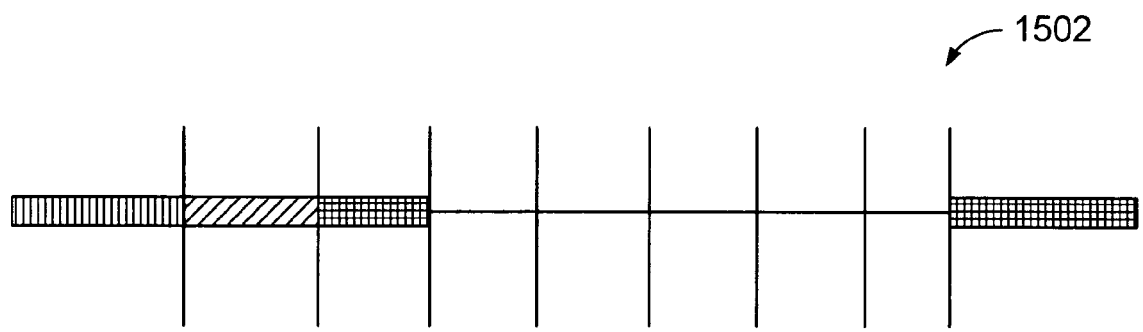
Figure 15:
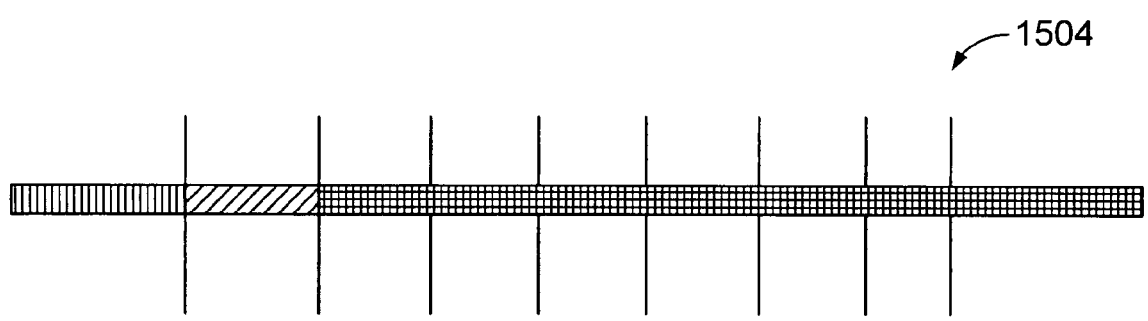

For example, FIG. 15 illustrates a drawing having a partially assigned path. In this example, drawing 1502 shows a partially assigned path. Intermediate unassigned subpaths are between purple subpaths, so they are assigned purple, as shown in drawing 1504.

Returning to FIG. 12A, for each subpath that does not yet have an attribute assigned, the full matching metrics of the match at its start vertex and its end vertex are compared. If the start vertex has a better match, the attribute of the out subpath of the start vertex's match is assigned to the subpath. If the end vertex has a better match, the attribute of the in subpath of the end vertex's match is assigned to the subpath. (1212)

Each pair of vertices v1 and v2 in the current path satisfying the following conditions is found (1214):

1214-1. Each vertex has a geometry match of 1 or less.
1214-2. v1 comes before v2 in parameterization order.
1214-3. The out subpath of v1's matching vertex is the same as the in subpath of v2's matching vertex.
1214-4. No vertices between v1 and v2 have a match quality of 1 or greater.

For each such pair, the attribute of the out subpath of v1's matching vertex is assigned to all subpaths between v1 and v2.

Figure 16A:
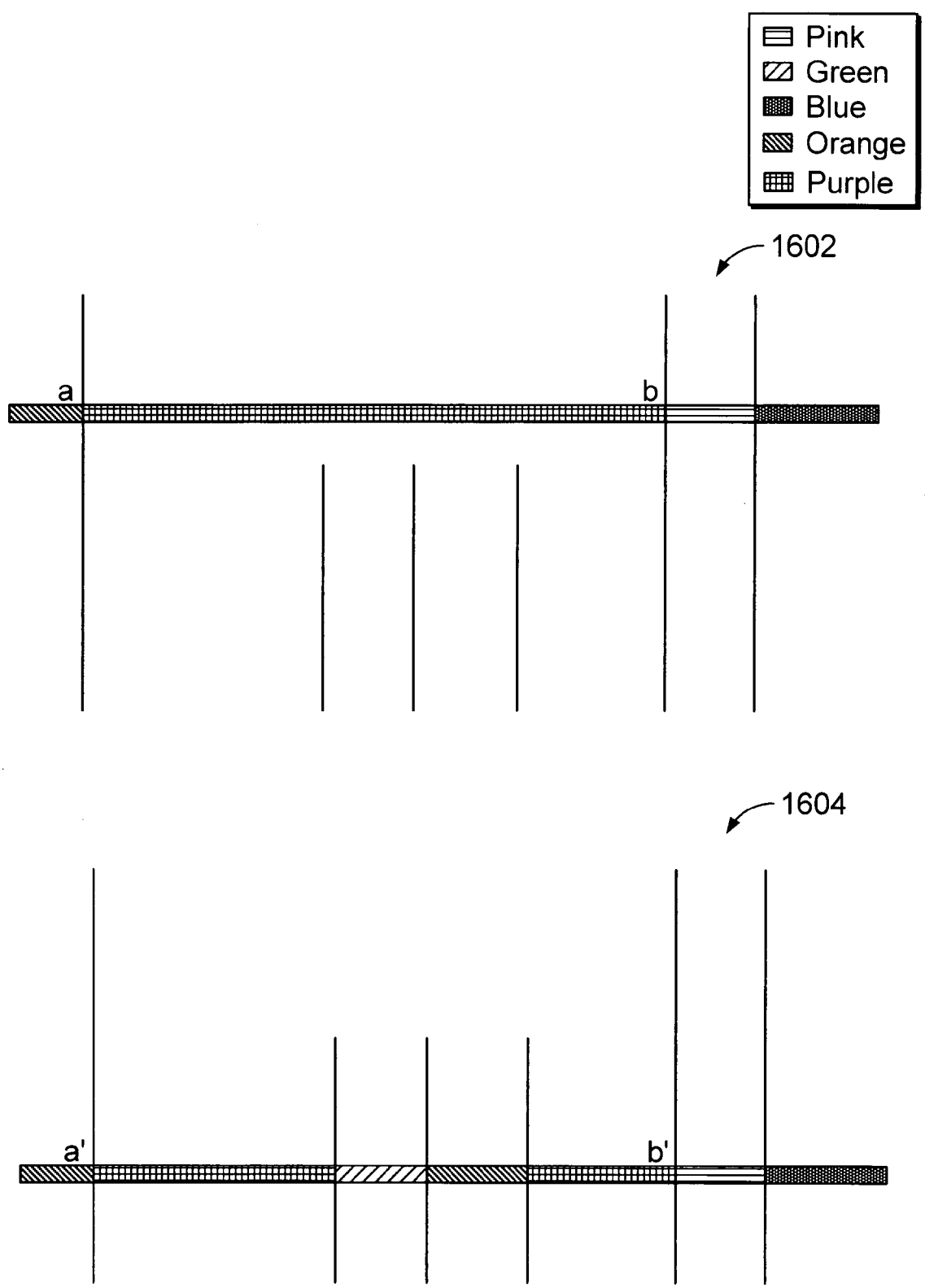
FIGS. 16A-B illustrate a drawing before and after assigning attributes.
Figure 16B:
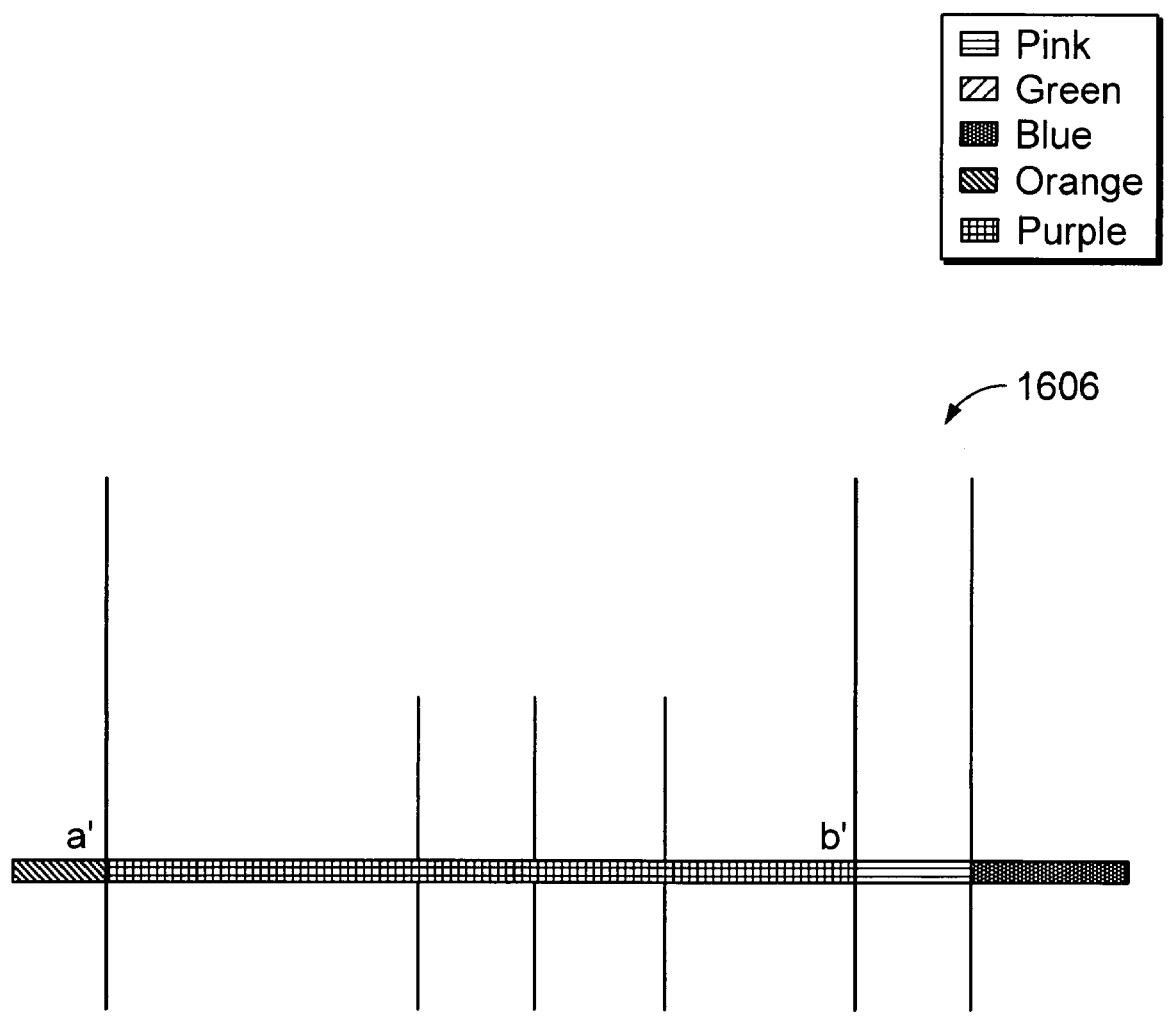

For example, FIGS. 16A-B illustrate a drawing before and after performing (1214). In this example, the horizontal line of drawing 1602 is moved. Given a sufficiently complex set of paths and modifications, an assignment similar to that shown in drawing 1604 is possible. Assume the matches between a' and b' are all poor. Since the out subpath of a is the same as the in subpath of b, its attribute is applied to all subpaths between a' and b', as shown in drawing 1606.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   receiving an indication that a drawing has been edited to combine a set of three or more previous subpaths into a current subpath, wherein each previous subpath is associated with a previous subpath attribute, at least two of the previous subpaths having a first previous subpath attribute and at least one of the previous subpaths having a second previous subpath attribute that is different from the first previous subpath attribute;
   determining, for each previous subpath attribute, the total length of the previous subpaths having the previous subpath attribute at least in part by summing the lengths of each previous subpath having the previous subpath attribute;
   determining the previous subpath attribute associated with the greatest total length; and
   assigning a current subpath attribute to the current subpath, the current subpath attribute being identical to the previous subpath attribute associated with the greatest total length, wherein assigning is performed by a processor.

2. A method as recited in claim 1, wherein at least one of the previous subpath attributes includes a color.

3. A method as recited in claim 1, wherein the drawing has been edited at least in part by removing a path.

4. A method as recited in claim 3, wherein the set of two or more previous subpaths are merged into the current subpath in response to removing the path.

5. A method as recited in claim 1, wherein the drawing has been edited at least in part by moving a path.

6. A method as recited in claim 1, wherein the drawing has been edited at least in part by removing a path that intersects the set of two or more previous subpaths.

7. A method as recited in claim 1, wherein the drawing has been edited at least in part by removing a path that separates the current subpath into the set of two or more previous subpaths.

8. A method as recited in claim 1, further including displaying the current subpath using the current subpath attribute.

9. A method as recited in claim 1, wherein the current subpath is displayed using a plurality of pixels.

10. A system, including:
    a processor configured to:
       receive an indication that a drawing has been edited to combine a set of three or more previous subpaths into a current subpath, wherein each previous subpath is associated with a previous subpath attribute, at least two of the previous subpaths having a first previous subpath attribute and at least one of the previous subpaths having a second previous subpath attribute that is different from the first previous subpath attribute;
       determine, for each previous subpath attribute, the total length of the previous subpaths having the previous subpath attribute at least in part by summing the lengths of each previous subpath having the previous subpath attribute;
       determine the previous subpath attribute associated with the greatest total length; and
       assign a current subpath attribute to the current subpath, the current subpath attribute being identical to the previous subpath attribute associated with the greatest total length, wherein assigning is performed by a processor;
    a memory coupled with the processor, wherein the memory provides the processor with instructions.

11. A computer program product, the computer program product being embodied in a computer readable medium and comprising computer instructions for:
    receiving an indication that a drawing has been edited to combine a set of three or more previous subpaths into a current subpath, wherein each previous subpath is associated with a previous subpath attribute, at least two of the previous subpaths having a first previous subpath attribute and at least one of the previous subpaths having a second previous subpath attribute that is different from the first previous subpath attribute;

determining, for each previous subpath attribute, the total length of the previous subpaths having the previous subpath attribute at least in part by summing the lengths of each previous subpath having the previous subpath attribute;

determining the previous subpath attribute associated with the greatest total length; and assigning a current subpath attribute to the current subpath, the current subpath attribute being identical to the previous subpath attribute associated with the greatest total length, wherein assigning is performed by a processor.

* * * * *